(12) United States Patent
D'Souza et al.

(10) Patent No.: US 9,505,179 B2
(45) Date of Patent: Nov. 29, 2016

(54) METHOD OF MANUFACTURING FIBROUS CORES

(71) Applicant: The Procter & Gamble Company, Cincinnati, OH (US)

(72) Inventors: Stephen Scott D'Souza, Cincinnati, OH (US); Robert Luther Heft, Jr., Rush Township, PA (US); Andre Mellin, Amberley Village, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 253 days.

(21) Appl. No.: 14/182,355

(22) Filed: Feb. 18, 2014

(65) Prior Publication Data
US 2014/0230997 A1 Aug. 21, 2014

Related U.S. Application Data

(60) Provisional application No. 61/767,362, filed on Feb. 21, 2013.

(51) Int. Cl.
| | |
|---|---|
| *B29C 53/58* | (2006.01) |
| *B29C 70/32* | (2006.01) |
| *B29D 23/18* | (2006.01) |
| *B29C 53/60* | (2006.01) |

(52) U.S. Cl.
CPC ............. *B29C 70/32* (2013.01); *B29C 53/586* (2013.01); *B29D 23/18* (2013.01); *B29C 53/60* (2013.01)

(58) Field of Classification Search
CPC .................................. B31C 3/00; B31C 3/04
See application file for complete search history.

(56) References Cited

U.S. PATENT DOCUMENTS

| | | | |
|---|---|---|---|
| 663,438 | A | 12/1900 | Hinde |
| 839,439 | A | 12/1906 | Underdown |
| 1,319,455 | A | 2/1918 | Bartlett |
| 1,412,018 | A | 5/1919 | Keller |

(Continued)

FOREIGN PATENT DOCUMENTS

| | | |
|---|---|---|
| CH | 549523 A | 5/1974 |
| DE | 27 00 368 A1 | 8/1977 |

(Continued)

OTHER PUBLICATIONS

"Single Face Corrugated Paper Packaging / Cardboard Tubes", The General Packaging Company, www.generalpackaging.co.uk, downloaded from the website on Jul. 31, 2014.

(Continued)

*Primary Examiner* — Jeff Aftergut
(74) *Attorney, Agent, or Firm* — Roddy M. Bullock

(57) ABSTRACT

The present disclosure is directed to a method for manufacturing a fibrous core comprises: providing a strip comprising at least one liner, and at least one fluted layer, wherein the strip has a leading edge, a trailing edge, a first strip face, a second strip face, and a strip axis substantially parallel to at least one of the leading edge and the trailing edge; feeding the strip to a mandrel having a central longitudinal axis extending in a longitudinal direction; winding the strip onto the mandrel such that the leading edge of the strip overlaps the trailing edge of the strip to form a fibrous core comprising an inner surface, an outer surface, and a longitudinal core axis; and adhering the leading edge to the trailing edge of the strip to from an overlap portion having an overlap width.

18 Claims, 35 Drawing Sheets

(56) References Cited

U.S. PATENT DOCUMENTS

| | | | |
|---|---|---|---|
| 1,908,108 A | 5/1933 | Boldman et al. | |
| 2,250,430 A * | 7/1941 | Wade | B31C 3/00 156/431 |
| 2,623,445 A * | 12/1952 | Robinson | B31C 3/00 138/141 |
| 2,737,091 A * | 3/1956 | Robinson | B31C 3/00 156/193 |
| 2,893,436 A | 7/1959 | Mann | |
| 3,014,501 A | 12/1961 | Jacobi | |
| 3,133,483 A | 5/1964 | Glasby | |
| 3,204,763 A | 9/1965 | Gustafson | |
| 3,255,684 A | 6/1966 | Risley et al. | |
| 3,544,034 A | 12/1970 | Roediger et al. | |
| 3,732,790 A * | 5/1973 | Miyake | B31B 45/00 156/195 |
| 3,785,908 A | 1/1974 | Wagers et al. | |
| 3,788,920 A | 1/1974 | Frappier et al. | |
| 3,908,523 A | 9/1975 | Shikaya | |
| 3,983,905 A | 10/1976 | Witzig | |
| 3,986,606 A | 10/1976 | Davis | |
| 4,287,244 A | 9/1981 | McMahon, Jr. et al. | |
| 5,205,473 A | 4/1993 | Coffin, Sr. | |
| 5,273,605 A | 12/1993 | Mitchell | |
| 5,393,582 A | 2/1995 | Wang et al. | |
| 5,495,810 A | 3/1996 | Yoshii | |
| 5,586,963 A | 12/1996 | Lennon et al. | |
| 5,601,887 A | 2/1997 | Rich et al. | |
| 5,671,897 A | 9/1997 | Ogg et al. | |
| 5,842,633 A | 12/1998 | Nurse | |
| 5,865,396 A | 2/1999 | Ogg et al. | |
| 6,036,139 A | 3/2000 | Ogg | |
| 6,089,483 A | 7/2000 | St-Laurent | |
| 6,302,086 B1 | 10/2001 | Kato | |
| 6,631,574 B2 | 10/2003 | Okyere | |
| 6,863,644 B1 | 3/2005 | Cook | |
| 7,007,887 B2 * | 3/2006 | van de Camp | B29C 53/581 242/118.32 |
| 7,331,504 B2 | 2/2008 | Languillat et al. | |
| 2002/0166270 A1 | 11/2002 | Okyere | |
| 2003/0006336 A1 | 1/2003 | Myers, Jr. | |
| 2003/0080233 A1 | 5/2003 | Von Paleske | |
| 2004/0096604 A1 | 5/2004 | van de Camp | |
| 2004/0182500 A1 | 9/2004 | Camp et al. | |
| 2004/0258886 A1 | 12/2004 | Maciag | |
| 2005/0089653 A1 | 4/2005 | Shoshany et al. | |
| 2005/0129884 A1 | 6/2005 | Jones | |
| 2006/0280883 A1 | 12/2006 | van de Camp | |
| 2007/0214690 A1 | 9/2007 | Pierce | |
| 2008/0060747 A1 | 3/2008 | Lee et al. | |
| 2008/0078685 A1 | 4/2008 | Patterson et al. | |
| 2008/0236730 A1 | 10/2008 | Marschke et al. | |
| 2009/0218435 A1 | 9/2009 | Morgan | |

FOREIGN PATENT DOCUMENTS

| | | |
|---|---|---|
| EP | 0 080 195 A2 | 6/1983 |
| EP | 0 825 132 A2 | 2/1998 |
| EP | 1 920 696 A2 | 5/2008 |
| GB | 861556 A | 2/1961 |
| GB | GB-1347244 A * | 2/1974 |
| GB | 1508833 | 4/1978 |
| JP | H 10119156 A | 5/1998 |
| JP | H 11277644 A | 10/1999 |
| JP | 11-277644 | 12/1999 |
| JP | 2002/034832 A | 2/2002 |
| TW | 382702 B | 2/2000 |
| WO | WO 2004/063073 A1 | 7/2004 |

OTHER PUBLICATIONS

International Search Report mailed Jun. 2, 2014.
U.S. Appl. No. 14/182,333, filed Feb. 18, 2014, Mellin, et al.
U.S. Appl. No. 14/182,342, filed Feb. 18, 2014, Mellin, et al.
U.S. Appl. No. 14/182,349, filed Feb. 18, 2014, Mellin, et al.
U.S. Appl. No. 14/182,364, filed Feb. 18, 2014, Mellin, et al.
U.S. Appl. No. 14/182,456, filed Feb. 18, 2014, Mellin.

* cited by examiner

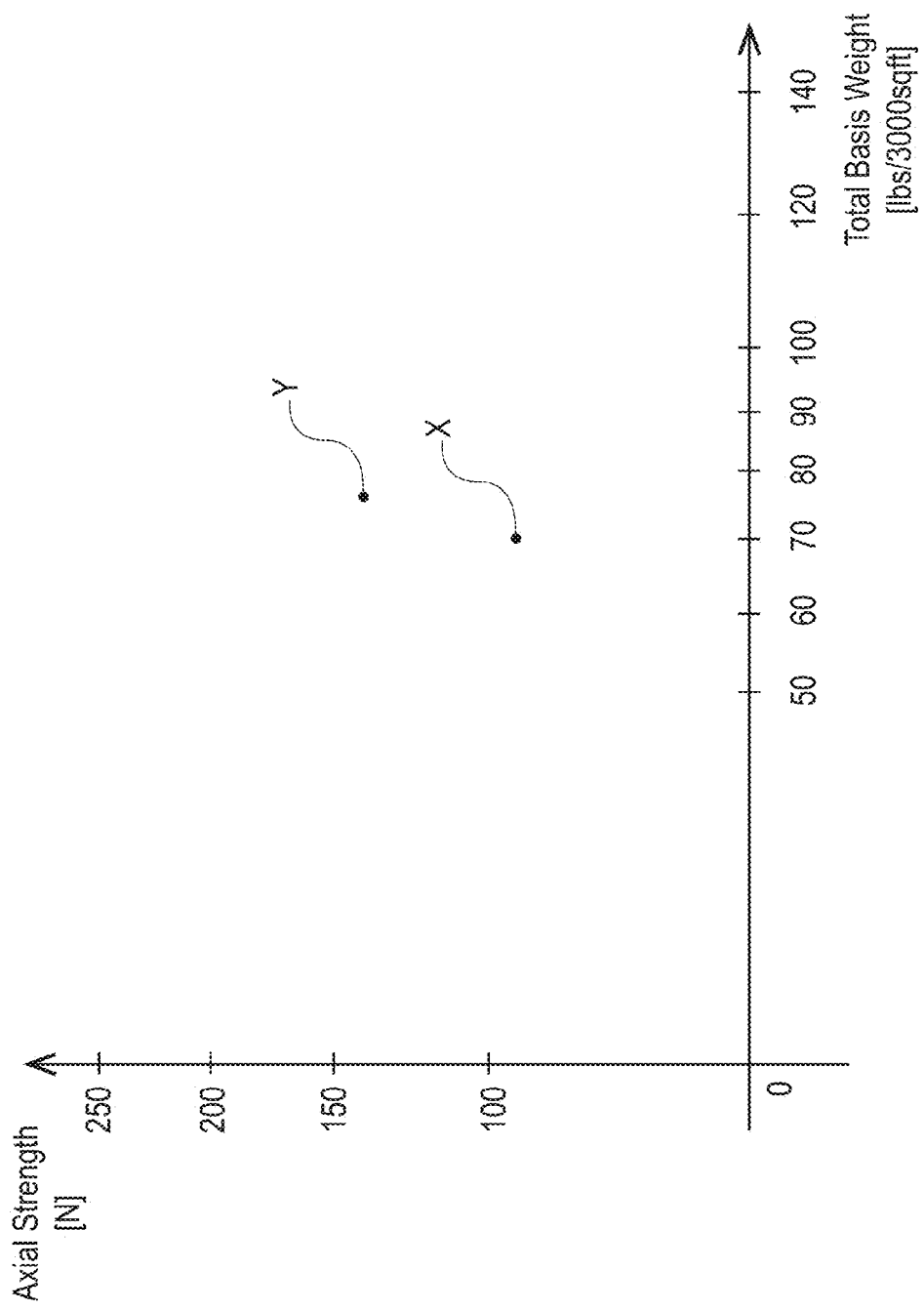

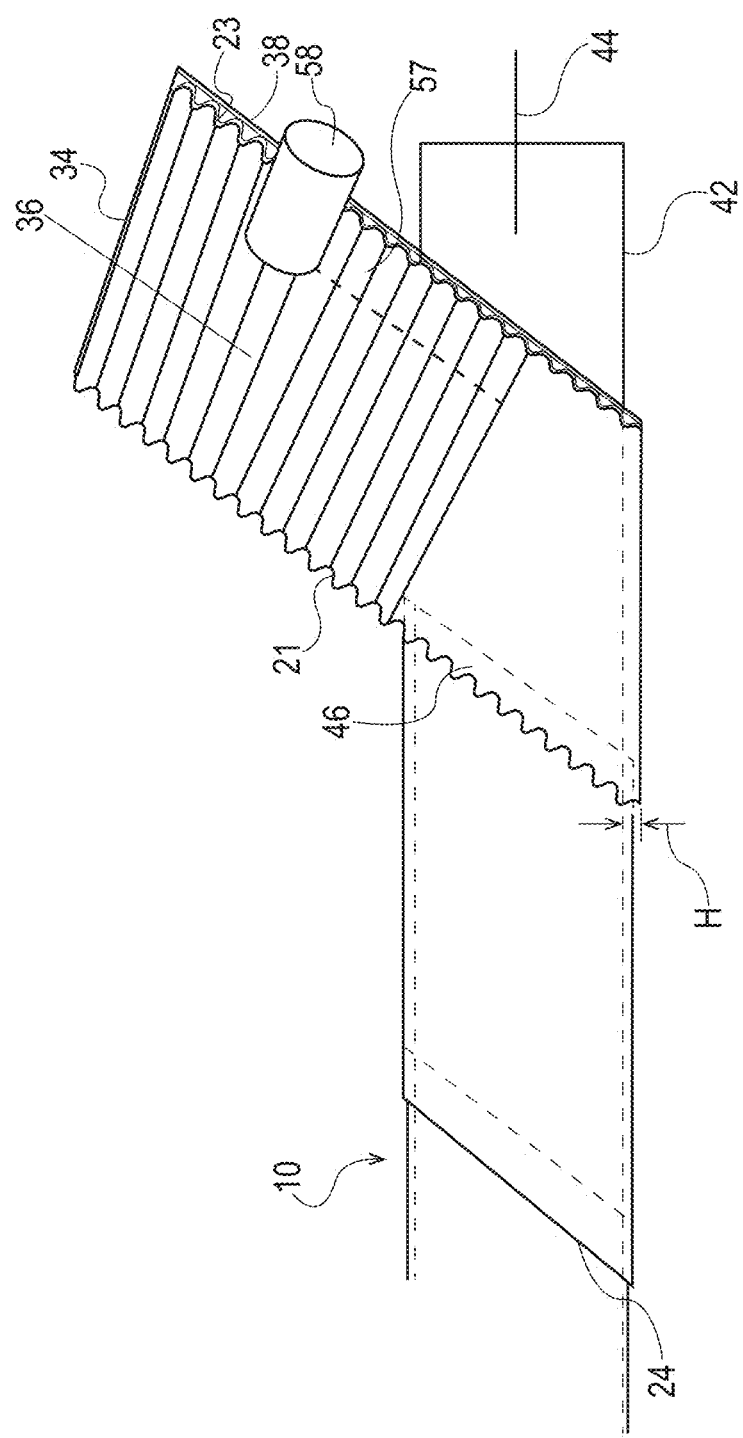

METHOD OF MANUFACTURING FIBROUS CORES

FIELD OF THE INVENTION

The present disclosure relates to a method for manufacturing cores for rolled products, and more specifically, relates to fibrous cores for rolled products having a reduced basis weight while still providing the requisite strength.

BACKGROUND

Helically wound cores are widely used for a variety of purposes. Cores can be intended for use by consumers and/or manufacturers. The products supported by the cores can include tape, yarn, paper, and other similar products. More specifically, such products supported by the cores can include sanitary tissues products, such as bath tissue and paper towels.

A helically wound core is formed by winding a material, such as paper stock, onto a cylindrical mandrel at a given wind angle, the material being wound such that each winding at least partially overlaps the previous winding and is adhered to itself at the seam or overlap to create a cylindrical core. Such cores are commonly used for rolled products where the rolled products are wound about the cores. The cores can provide stability to the rolled products during winding, shipping, dispensing, and storage of the rolled products. Typical paper cores can be made from pulp fiber and/or recycled pulp fiber.

In many applications, certain strength properties of cores for rolled products are important, especially depending on the type of product to be wound about the cores. Sufficiently high side-to-side, or radial, strength, for example, is important to ensure the cores can resist collapse when under side-to-side pressure during handling and shipping. Collapsed or partially collapsed cores cause the core to be misshaped during use, which negatively impacts consumer dispensing from a roll holder. Likewise, sufficiently high axial strength is important to provide crush-resistance of rolled products stacked vertically during storage and shipping. The core provides structural support and stability allowing for rolled products to be stacked on shipping pallets, for example, without collapse or distortion of the rolled product.

For paper cores radial strength and/or axial strength can be impacted by dimensional variations, such as core diameter and core wall thickness, or by material selection and processing. In general, core strength can be increased by increasing wall thickness (i.e., by increasing the paper basis weight or by adding layers,) and/or employing stronger plies (i.e., increasing strength through adding more fibers) for the layer or layers of the wound core. In regard to the latter, paper or paperboard is available in a wide variety of grades. In general, paper or paperboard strength can be improved by mechanical refining of paper pulp or paperboard pulp. Thus, a well-beaten pulp generally produces a stronger grade of paper or paperboard compared to a lightly beaten pulp. In addition, paper or paperboard strength can be improved by compressing (i.e., densifying) the paper or paperboard during manufacturing. Further, paper or paperboard strength is influenced by fiber type and quality. Generally, stronger paper or paperboard sheets have a higher density than lower strength paper or paperboard sheets. Stated differently, the above treatments generally result in an increase in paper or paperboard density along with an increase in paper or paperboard strength. These higher density, higher strength paper or paperboards are also more costly because of the additional fiber or material costs or processing costs.

In general, a core for a rolled product should have certain minimum strength properties to be able to maintain integrity and dimensions during manufacture and use. At the same time, the core manufacturer desires to minimize the cost of producing the cores by using fewer fibers, less materials, and/or less fiber processing.

Furthermore, manufacturers desire that consumers of rolled sheet products be able to identify their brand or logo for better brand awareness. Better brand awareness can result in higher levels of re-purchase of product.

Accordingly, there is a continuing unmet need for cores for rolled products that have reduced cost while maintaining sufficient strength properties.

Additionally, there is a continuing unmet need for cores for rolled products that can be optimized for cost and strength while being manufactured on existing roll-forming equipment.

Further, there is an unmet need for low cost, relatively high strength cores which can deliver other manufacturing or consumer benefits.

Further still, there is a continuing unmet need to provide consumer awareness of product branding before and after use.

Still further, there is a continuing unmet need for cores for rolled products that can exhibit branding or other indicia helpful for consumer awareness of brand identification.

SUMMARY

The present disclosure is directed to a method for manufacturing a fibrous core, the method comprises: providing a strip comprising at least one liner, and at least one fluted layer, wherein the strip has a leading edge, a trailing edge opposite the leading edge, a first strip face, a second strip face opposite the first strip face, and a strip axis substantially parallel to at least one of the leading edge and the trailing edge; feeding the strip to a mandrel having a central longitudinal axis extending in a longitudinal direction, wherein the strip axis forms a wind angle with the central longitudinal axis; winding the strip onto the mandrel such that the leading edge of the strip overlaps the trailing edge of the strip to form a fibrous core comprising an inner surface, an outer surface, and a longitudinal core axis; and adhering the leading edge to the trailing edge of the strip to from an overlap portion having an overlap width.

BRIEF DESCRIPTION OF THE DRAWINGS

The above-mentioned and other features and advantages of this disclosure, and the manner of attaining them, will become more apparent and the disclosure itself will be better understood by reference to the following description of non-limiting embodiments of the disclosure taken in conjunction with the accompanying drawings, wherein:

FIG. 4 is a graph showing an area of strength versus basis weight of a fibrous core of the present disclosure;

FIGS. 6 A-D are perspective views of strips of material suitable for making a fibrous core in accordance with one non-limiting embodiment of the present disclosure;

FIG. 9 is a side view of a fibrous core being formed on mandrel in accordance with one non-limiting embodiment of the present disclosure;

DETAILED DESCRIPTION

Figure 1:
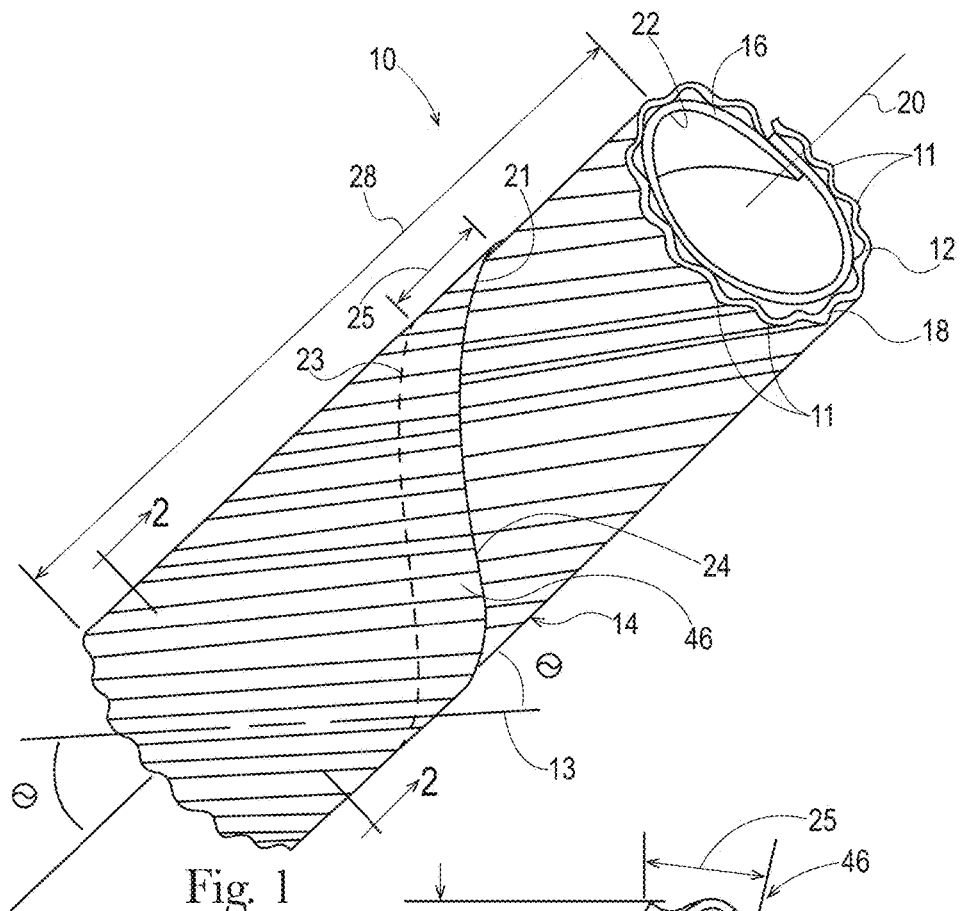
FIG. 1 is a perspective view of a fibrous core in accordance with one non-limiting embodiment of the present disclosure.

Various non-limiting embodiments of the present disclosure will now be described to provide an overall understanding of the principles of the structure, function, manufacture, and use of the cores for rolled products disclosed herein. The features illustrated or described in connection with one non-limiting embodiment can be combined with the features of other non-limiting embodiments. Such modifications and variations are intended to be included within the scope of this disclosure.

"Fiber" as used herein means an elongate physical structure having an apparent length greatly exceeding its apparent diameter (i.e., a length to diameter ratio of at least about 10.) Fibers having a non-circular cross-section and/or tubular shape are common; the "diameter" in this case can be considered to be the diameter of a circle having a cross-sectional area equal to the cross-sectional area of the fiber. More specifically, as used herein, "fiber" refers to fibrous structure-making fibers. This disclosure contemplates the use of a variety of fibrous structure-making fibers, such as, for example, natural fibers or synthetic fibers, or any other suitable fibers, and any combination thereof.

"Fibrous structure" as used herein means a structure that comprises one or more fibers. Non-limiting examples of processes for making fibrous structures include known wet-laid papermaking processes and air-laid papermaking processes. Such processes typically comprise the steps of preparing a fiber composition in the form of a suspension in a medium, either wet, more specifically aqueous medium, or dry, more specifically gaseous, i.e. with air as medium. The aqueous medium used for wet-laid processes is oftentimes referred to as fiber slurry. The fibrous suspension is then used to deposit a plurality of fibers onto a forming wire or belt such that an embryonic fibrous structure is formed, after which drying and/or bonding the fibers together results in a fibrous structure. Further processing the fibrous structure can be carried out such that a finished fibrous structure is formed. For example, in typical papermaking processes, the finished fibrous structure is the fibrous structure that is wound on the reel at the end of papermaking and can subsequently be converted into a finished product (e.g., a rolled sanitary tissue product).

"Sanitary tissue product" as used herein means one or more finished fibrous structures, that is useful as a wiping implement for post-urinary and post-bowel movement cleaning (e.g., toilet tissue and wet wipes), for otorhinolaryngological discharges (e.g., facial tissue), and multi-functional absorbent and cleaning and drying uses (e.g., paper towels, shop towels). The sanitary tissue products can be embossed or not embossed and creped or uncreped.

"Fibrous core" as used herein means a tubular structure that comprises one or more fibers, such as is commonly used for bath tissue and paper towels. The present disclosure is an improvement over known fibrous cores.

"Rolled product(s)" as used herein include plastics, fibrous structures, paper, sanitary tissue products, paperboard, polymeric materials, aluminum foils, and/or films that are wound about a core. Toilet tissue and paper towels are examples of rolled products, specifically rolled sanitary tissue products.

In one example, sanitary tissue products rolled about a fibrous core of the present disclosure can have a basis weight between about 10 $g/m^2$ to about 160 $g/m^2$ or from about 20 $g/m^2$ to about 150 $g/m^2$ or from about 35 $g/m^2$ to about 120 $g/m^2$ or from about 55 to 100 $g/m^2$, specifically reciting all 0.1 $g/m^2$ increments within the recited ranges. In addition, the sanitary tissue products can have a basis weight between about 40 $g/m^2$ to about 140 $g/m^2$ and/or from about 50 $g/m^2$ to about 120 $g/m^2$ and/or from about 55 $g/m^2$ to about 105 $g/m^2$ and/or from about 60 to 100 $g/m^2$, specifically reciting all 0.1 $g/m^2$ increments within the recited ranges. Other basis weights for other materials, such as wrapping paper and aluminum foil, are also within the scope of the present disclosure.

"Basis Weight" as used herein is the weight per unit area of a sample reported in lbs/3000 $ft^2$ or $g/m^2$. Basis weight can be measured by preparing one or more samples to create a total area (i.e., flat, in the material's non-cylindrical form) of at least 100 $in^2$ (accurate to +/−0.1 $in^2$) and weighing the sample(s) on a top loading calibrated balance with a resolution of 0.001 g or smaller. The balance is protected from air drafts and other disturbances using a draft shield. Weights are recorded when the readings on the balance become constant. The total weight (lbs or g) is calculated and the total area of the samples ($ft^2$ or $m^2$) is measured. The basis weight in units of lbs/3,000 $ft^2$ is calculated by dividing the total weight (lbs) by the total area of the samples ($ft^2$) and multiplying by 3000. The basis weight in units of $g/m^2$ is calculated by dividing the total weight (g) by the total area of the samples ($m^2$).

In one embodiment, the present disclosure provides, in part, fibrous cores for rolled products which can have equal or higher ratios of strength to basis weight when compared to known cores. In one embodiment, this higher ratio is achieved on a core comprising a laminate material of a fluted (or corrugated) layer (also known in the field of corrugate materials as a "medium") and a non-fluted liner which when adhered together make a single-face corrugate material. The single-face corrugate material can be wound and adhered to form a core of the present disclosure. The resulting core can provide substantially equivalent radial or axial strength with reduced basis weight relative to known cores for rolled sanitary tissue products. Likewise, the resulting core can provide higher radial or axial strength with equal basis weight relative to known cores for rolled sanitary tissue products.

"Machine Direction," MD, as used herein is the direction of manufacture for a fibrous core. The machine direction can be the direction in which the strip of material progresses during its manufacture, such that the MD is parallel to a length direction of the strip of material. The machine direction can be the direction in which the strip of material is fed onto the mandrel in one embodiment. The machine direction can be the direction in which the wound fibrous core travels as it progresses on the mandrel and/or to a subsequent operation.

"Cross Machine Direction," CD as used herein is the direction substantially perpendicular to the machine direction. The cross machine direction can be the direction substantially perpendicular to the direction a strip of material progresses during its manufacture, such that the CD is perpendicular to a length direction of the strip of material. The cross machine direction can be the direction substantially perpendicular to the direction in which the wound fibrous core travels as it progresses on the mandrel in another embodiment.

In one embodiment, as shown in FIG. 1, a fibrous core 10 comprises a wound fluted layer 12 and a liner 16 that forms a tubular structure having an inner surface 22 and an outer surface 14. The fluted layer 12 and liner 16 can be in the form of a single face corrugate material 18 wound into a tubular structure that defines a central longitudinal axis 20 of the fibrous core 10. The fluted layer 12 comprises a plurality of flutes 11. Each of the plurality of flutes 11 has a flute axis 13. The flute axis 13 of each of the plurality of flutes 11 can extend at an angle Θ to the central longitudinal axis 20 of the fibrous core 10. For a cylindrical fibrous core 10, it can be understood that each flute axis 13 of each flute 11 can be parallel to adjacent flute axes, and each makes an angle Θ with respect to longitudinal axis 20 that is substantially equal to the angle Θ made with an outside surface 14 of the fibrous core 10 at a tangent thereto. More specifically, for example, the flute axis 13 of each of the plurality of flutes 11 can extend at an angle Θ of about 5 degrees to about 85 degrees, and/or about 15 degrees to about 75 degrees and/or about 25 degrees to about 65 degrees, and/or about 35 degrees to about 55 degrees relative to the longitudinal axis 20. In an embodiment, angle Θ can be about 45 degrees. In an embodiment, angle Θ can be about 43.5 degrees.

The material to be wound, such as a single face corrugate material 18, can be a strip 34 (as described more fully below) from about 2 inches wide to about 8 inches wide. The strip 34 can be wound such that a leading edge 21 can overlap a trailing edge 23 to form a seam 24 and an overlap portion 46 having an overlap width 25 of from about one-eighth inch to about 2 inches, including every one-eighth inch increment in between. For example, an overlap width 25 of about 2.75 inches is disclosed by the range taught above. Alternatively, in one example embodiment, the strip 34 can be wound such that a leading edge 21 can abut a trailing edge 23 to form a seam 24.

The fibrous core 10 can have a length 28 of from about two inches to about 100 inches, including every ¼ inch increment in between. For example, length 28 of about 21.25 inches is disclosed by the range taught above. The fibrous core 10 can have a length 28 sufficient to fit conventional sanitary tissue product holders such as holders for toilet tissue or paper towels. Length 28 can be from about 2.5 inches to about 5 inches, or from about 6 inches to about 12 inches, for example. In an embodiment, the length 28 can be from 3.75 to about 4.25 inches.

Figure 2:
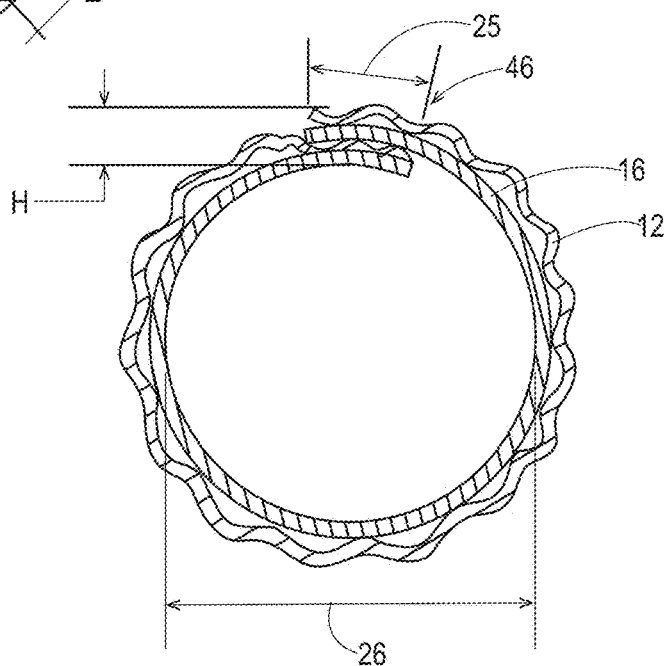
FIG. 2 is a cross sectional view of Section 2-2 of FIG. 1.

As shown in the cross section of FIG. 2, the fibrous core 10 can have an inside diameter 26 sufficient for the intended use. For example, if the fibrous core 10 is intended to be used for bath/toilet tissue, the inside diameter 26 can be greater than the outside diameter of the spindle of the bath tissue roll holder such that the inside diameter 26 of the fibrous core can substantially surround the holder for bath tissue or paper towel product. The inside diameter 26 can be from about ¾ inch to about 4 inches, including every increment of ⅛ in between. For example, an inside diameter 26 of about 2.125 inches is disclosed by the range taught above. The diameter can be from about 1 inch to about 1.5 inches, for example.

In one embodiment, the fibrous core 10 can be as described above with respect to FIG. 1, but with the liner 16 on the outside of the fibrous core 10, and the fluted layer 12 being disposed to the interior of the fibrous core 10. In this embodiment, the liner forms a generally smooth outer surface 14.

In one embodiment, the fibrous core 10 can comprise one or more liners 16 and/or one or more fluted layers 12. The basis weight of the fibrous core 10 is substantially equal to the sum of the basis weights of each of the materials used to form the fibrous core 10. In one example embodiment, the fibrous core 10 comprises a liner 16 and a fluted layer 12. Thus, generally, the basis weight of the fibrous core 10 can be the basis weight of the liner 16 added to the basis weight of the fluted layer 12. For example, the fibrous core 10 can have a basis weight of from about 30 lbs/3000 sq. ft. to about 150 lbs/3000 sq. ft. and/or about 50 lbs/3000 sq. ft. to about 120 lbs/3000 sq. ft. and/or about 60 lbs lbs/3000 sq. ft. to about 100 lbs/3000 sq. ft., specifically reciting all 0.5 lbs/3000 sq. ft. increments within the recited ranges.

In one example embodiment, the basis weight of the liner 16 can be less than, greater than, or equal to the basis weight of the fluted layer 12. More specifically, for example, the basis weight of the liner 16 can be from about 30 lbs/3000 sq. ft. to about 75 lbs/3000 sq. ft. or about 40 lbs/3000 sq. ft. to about 65 lbs/3000 sq. ft., specifically reciting all 0.5 lbs/3000 sq. ft. increments within the recited ranges. For example, a liner 16 basis weight of about 32 lbs/3000 sq. ft. is disclosed by the range taught above. Similarly, the basis weight of the fluted layer 12 can be from about 25 lbs/3000 sq. ft. to about 70 lbs/3000 sq. ft. or about 30 lbs/3000 sq. ft. to about 60 lbs/3000 sq. ft. or about 35 lbs/3000 sq. ft. to about 50 lbs/3000 sq. ft., specifically reciting all 0.5 lbs/3000 sq. ft. increments within the recited ranges. For example, a fluted layer 12 basis weight of about 32 lbs/3000 sq. ft. is disclosed by the range taught above.

Figure 3:
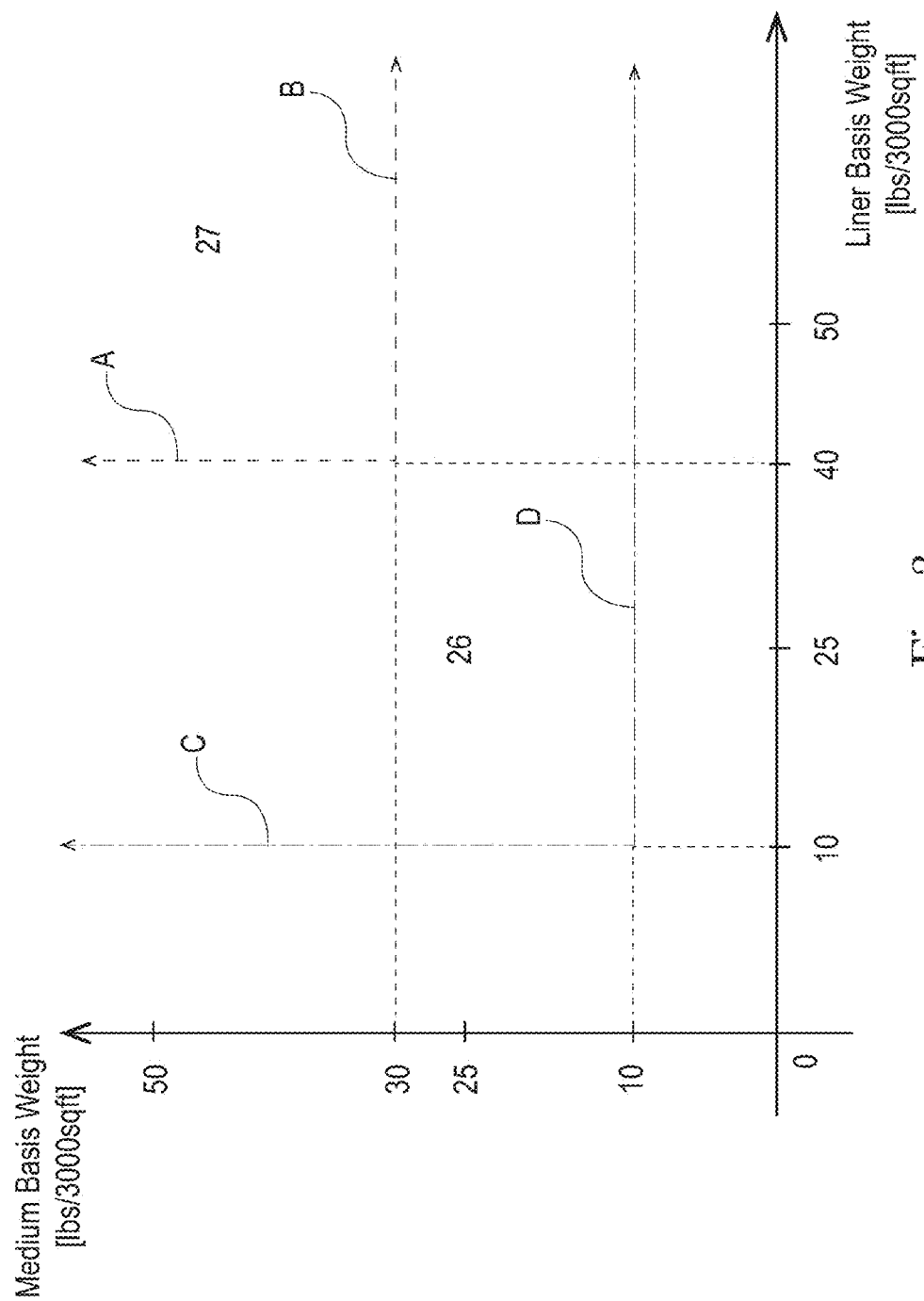
FIG. 3 is a graph showing an area of strength based on basis weight of a fibrous core of the present disclosure.

Surprisingly, the inventors have discovered that sufficient strength for an intended purpose, i.e., axial strength, can be obtained at a lower fibrous core basis weight (relative to known cores) by forming a fibrous core 10 from a single face corrugate material 18 (as described above with respect to FIG. 1) in which liner 16 basis weight and the fluted layer basis weight fall within certain ranges, including ranges in which the liner 16 basis weight is greater than the fluted layer 12 basis weight. The basis weight of the liner 16 can be from about 5% to about 90% and/or about 10% to about 50% and/or about 15% to about 30% greater than the fluted layer 12. FIG. 3 shows a graph of liner basis weight versus fluted layer basis weight. The inventors have surprisingly found that a fibrous core 10 for rolled tissue products having a basis weight shown by an area 27, defined by lines A and B, indicates one range of acceptable combinations of basis weights of the liner 16 and fluted layer 12. Stated another way, a liner 16 having a basis weight above about 40 lbs/3000 sq. ft. and a fluted layer 12 having a basis weight above about 30 lbs/3000 sq. ft. is defined by the area 27 and can be suitable for use as a fibrous core 10 for rolled sheet products. When fibrous cores are made within the above-described ranges, the fibrous cores can deliver the required strength necessary to withstand manufacture, handling, shipping, and storage at a basis weight, which is less than the basis weight of typical fibrous cores currently used for such products. Still referring to FIG. 3, it is believed that the fibrous core 10 of the present disclosure can provide adequate strength with further reduced basis weight for other rolled sheet products. A fibrous core 10 having a basis weight shown by area 26, defined by lines C and D, indicates another range of acceptable combinations of basis weights of the liner 16 and fluted layer 12. For example, the fibrous core 10 for a rolled product such as aluminum may need to withstand less axial and/or radial strength because it is housed within a package. Thus, the basis weight of the fibrous core 10 can be reduced but still maintain a desired axial and/or radial strength.

Typical basis weights for some currently marketed fibrous cores for toilet tissue and paper towels are shown in Tables 1 and 2 below.

TABLE 1

Basis weights of cores for toilet tissue
Toilet Tissue

| | | Manufacturer | | | | | |
|---|---|---|---|---|---|---|---|
| | | P&G | GP | GP | KC | Clearwater | Kruger |
| | | | | Brand | | | |
| | | Ultra Strong | Quilted Northern | Quilted Northern Ultra Plush | Scott 1000 | Kroger | Walmart |
| 1. Roll | | | | | | | |
| Weight | [g] | 82 | 133 | 115 | 210 | 138 | 122 |
| Diameter | [mm] | 106 | 123 | 118 | 120 | 116 | 115 |
| Width | [mm] | 103 | 102 | 104 | 116 | 109 | 108 |
| 2. Core | | | | | | | |
| Diameter inside | [mm] | 42 | 50 | 44 | 46 | 47 | 44 |
| Wall thickness | [mm] | 0.4 | 0.4 | 0.4 | 0.6 | 0.4 | 0.4 |
| Weight | [g] | 4 | 5 | 5.4 | 6.9 | 5.8 | 6.3 |
| BW estimate* | [lbs/3000 sqft] | 156 | 166 | 198 | 220 | 189 | 221 |
| 3. Substrate | | | | | | | |
| Weight/roll | [g] | 78 | 128 | 110 | 203 | 132 | 116 |
| Core weight % of total product | | 4.9% | 3.8% | 4.7% | 3.3% | 4.2% | 5.2% |

*Core glue subtracted

TABLE 2

Basis weights of cores for paper towels Towel

| | | Manufacturer | | | | | | |
|---|---|---|---|---|---|---|---|---|
| | | P&G | Clearwater | Unknown | Unknown Brand | Green Bay Converting | GP | Marcal |
| | | Bounty Basic | Meijer | Dollar General | Family Dollar | Kroger | Walmart | Recycled |
| 1. Roll | | | | | | | | |
| Weight | [g] | 203 | 318 | 259 | 133 | 216 | 234 | 204 |
| Diameter | [mm] | 138 | 138 | 137 | 108 | 121 | 122 | 120 |
| Width | [mm] | 282 | 283 | 278 | 280 | 279 | 279 | 280 |
| 2. Core | | | | | | | | |
| Diameter inside | [mm] | 42 | 47 | 45 | 45 | 45 | 47 | 44 |
| Wallthickness | [mm] | 0.4 | 0.5 | 0.8 | 0.8 | 0.7 | 0.6 | 0.5 |
| Weight | [g] | 11.5 | 15.5 | 17.3 | 18.8 | 17 | 18.2 | 15.7 |
| BW estimate* | [lbs/3000 sqft] | 156 | 189 | 222 | 238 | 219 | 224 | 205 |
| 3. Substrate | | | | | | | | |
| Weight/roll | [g] | 192 | 303 | 241 | 114 | 199 | 216 | 189 |
| Core weight % of total product | | 5.7% | 4.9% | 6.7% | 14.2% | 7.9% | 7.8% | 7.7% |

*Core glue subtracted

As can be seen in Tables 1 and 2, existing fibrous cores range in basis weight from about 156 lbs/3000 sq. ft. to about 238 lbs/3000 sq. ft. It is known that for bath tissue and paper towel products, an axial strength of the fibrous core of at least about 50 N to about 250 N is acceptable for stable product shipping and storage. More specifically, an axial strength of the fibrous core 10 of at least about 200 N is acceptable for stable product shipping and storage. In the case of BOUNTY® brand paper towels and CHARMIN® brand toilet tissue, conventional fibrous cores being made of pressed paperboard and having a basis weight of 156 lbs/ 3000 sq. ft. have acceptable strength for commercial purposes and are currently marketed. The acceptable strength of the fibrous core 10 is based solely on an un-used fibrous core 10 and not in combination with a rolled sheet product. One of ordinary skill in the art would understand that the strength of the fibrous core 10 would change if the axial strength were determined with the rolled sheet product wound about the fibrous core 10. For example, depending on whether the rolled sheet product is tightly wound or loosely wound and the density of the rolled sheet product, the rolled sheet product can affect the axial strength. Thus, a loosely wound rolled sheet product would impart less structural support to the fibrous core, which could in turn require an increase in the basis weight of the fibrous core, as compared to a tightly wound rolled sheet product.

As shown in FIG. 4, the fibrous cores 10 of the present disclosure present an improved fibrous core that provides for sufficient axial strength at a reduced basis weight. Axial strength can be measured by the Axial Strength Test described below. In one embodiment, a fibrous core 10 can have a liner 16 basis weight of 35 lbs/3000 sq. ft. and a fluted layer 12 basis weight of 35 lbs/3000 sq. ft. for a total basis weight of 70 lbs/3000 sq. ft., and can deliver an axial strength of about 100 N, as shown by data point X in FIG. 4. In another embodiment, a fibrous core 10 can have a liner 16 basis weight of 40 lbs/3000 sq. ft. and a fluted layer 12 basis weight of 35 lbs/3000 sq. ft. for a total basis weight of 75 lbs/3000 sq. ft., and deliver an axial strength of about 150 N, as shown by data point Y in FIG. 4. By merely increasing the basis weight of the liner 16 by 5 lbs/3000 sq. ft., the axial strength of the fibrous core increased a factor of about 1.5. Based on this analysis, the inventors believe that, a fibrous core 10 comprising have a liner 16 having a basis weight of about 60 lbs/3000 sq. ft. and a fluted layer 12 having a basis weight of about 60 lbs/3000 sq. ft. (total basis weight of 120 lbs/3000 sq. ft.) can deliver an axial strength of at least about 200 N. In general, by varying the basis weight of the liner 16 and the basis weight of the fluted layer 12, but keeping the liner 16 basis weight relatively higher than that of the fluted layer 12, fibrous cores 10 of the present disclosure can yield unexpected improvements in the ratio of axial strength to total basis weight. As shown with respect to data points X and Y of FIG. 4, for example, by increasing total basis weight from 70 lbs to 75 lbs, the axial strength was disproportionately increased from about 100 N to about 150N. This "leveraging of component basis weights" aspect of the present invention allows fibrous cores to be made at lower basis weights relative to current conventional paperboard fibrous cores while delivering acceptable/equivalent axial strength. For commercial manufacturers of toilet tissue or paper towels, the cost savings that result from such an improvement are significant.

Figure 5A:
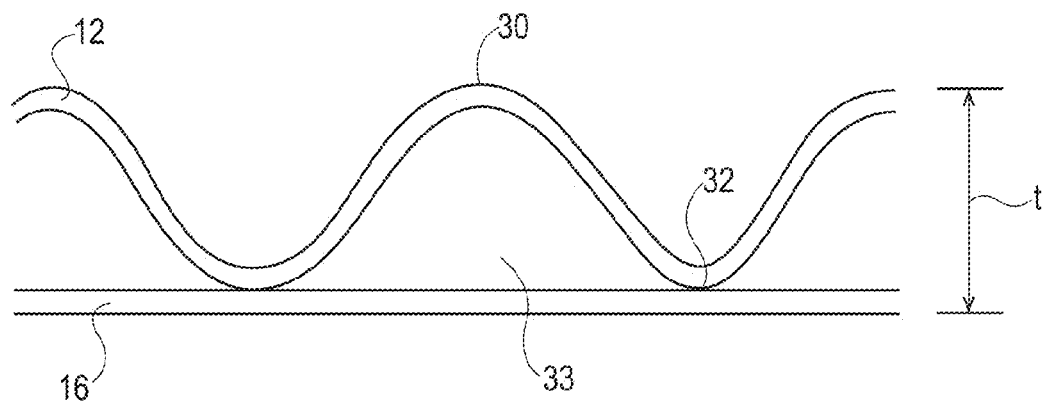
FIG. 5A is a partial side view of a single-face corrugate material in accordance with one non-limiting embodiment of the present disclosure.
Figure 5B:
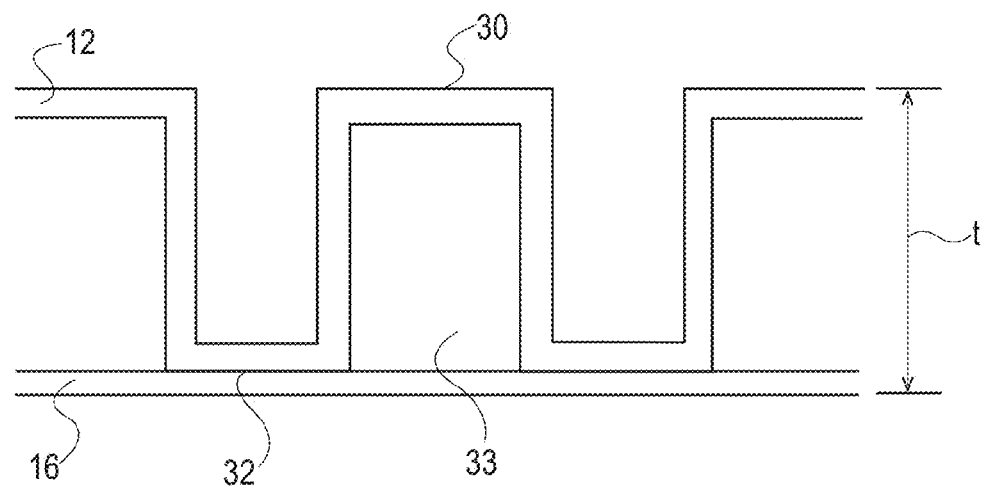
FIG. 5B is a partial side view of a single-face corrugate material in accordance with one non-limiting embodiment of the present disclosure.

A material suitable for use in a fibrous core 10 of the present disclosure is shown in more detail in FIG. 5A. As shown in a partial side view, a fluted layer 12 comprises a plurality of flutes 11. Each segment of the plurality of flutes 11 comprises at least one peak 30 and at least one valley 32. The liner 16 can be attached to at least one peak 30 and/or at least one valley 32, as is known in the art for single face corrugate materials. More specifically, the liner 16 can be adhesively bonded to a portion of at least one peak 30 and/or at least one valley 32. The flutes define a channel 33 in an interior portion between the inside of peaks 30 and the liner 16. The volume of adjacent channels 33 can be substantially the same or different relative to one another. Stated another way, the distance between the liner 33 and a peak 30 can vary between adjacent flutes 11 relative to one another. The plurality of flutes 11 of the single-face corrugate material 18 can be sized according to industry standard wherein the flute size refers to the number of flutes per linear foot. Single face corrugate material is a commonly known material in the industry and, thus, can be designated by known characteristics. Commonly known flute sizes are designated A, B, C, E, and F. More specifically, for example, an F flute single-face corrugate material 18 has a plurality of flutes 11 having a flute size from about 124 flutes per linear foot to about 132 flutes per linear foot and a flute thickness of about $1/32$ of an inch. The thickness t of the single-face corrugate material 18 is substantially equal to the thickness of the fluted layer 12 (taking into account the amplitude of the peaks and valleys) and the thickness of the liner 16. In an embodiment of the present disclosure, the single-face corrugate material 18 can be an F-flute, and can have a thickness t substantially equal to about $1/64$ inch to about $1/16$ inch. A suitable single-face corrugate material 18 is commercially available from Burrows Paper Corporation. Without being bound by theory, it is believed that the plurality of flutes 11 can be manufactured in any wave-form shape such as a crescent/sinusoidal shape, as shown in FIG. 5A, or a square-wave block shape, as shown in FIG. 5B, or a polygonal shape, not shown.

In general, a fibrous core 10 of the present disclosure can have multiple layers of wrapped material, including one or more layers of liners 16, fluted layers 12, single face corrugate material 18, single wall corrugate material, and combinations thereof. In an embodiment, as described below, the wound material can be a single face corrugate material 18 cut into strip form and wound into a supply roll which can subsequently be supplied to and unwound onto a mandrel, as described herein.

Figure 6:
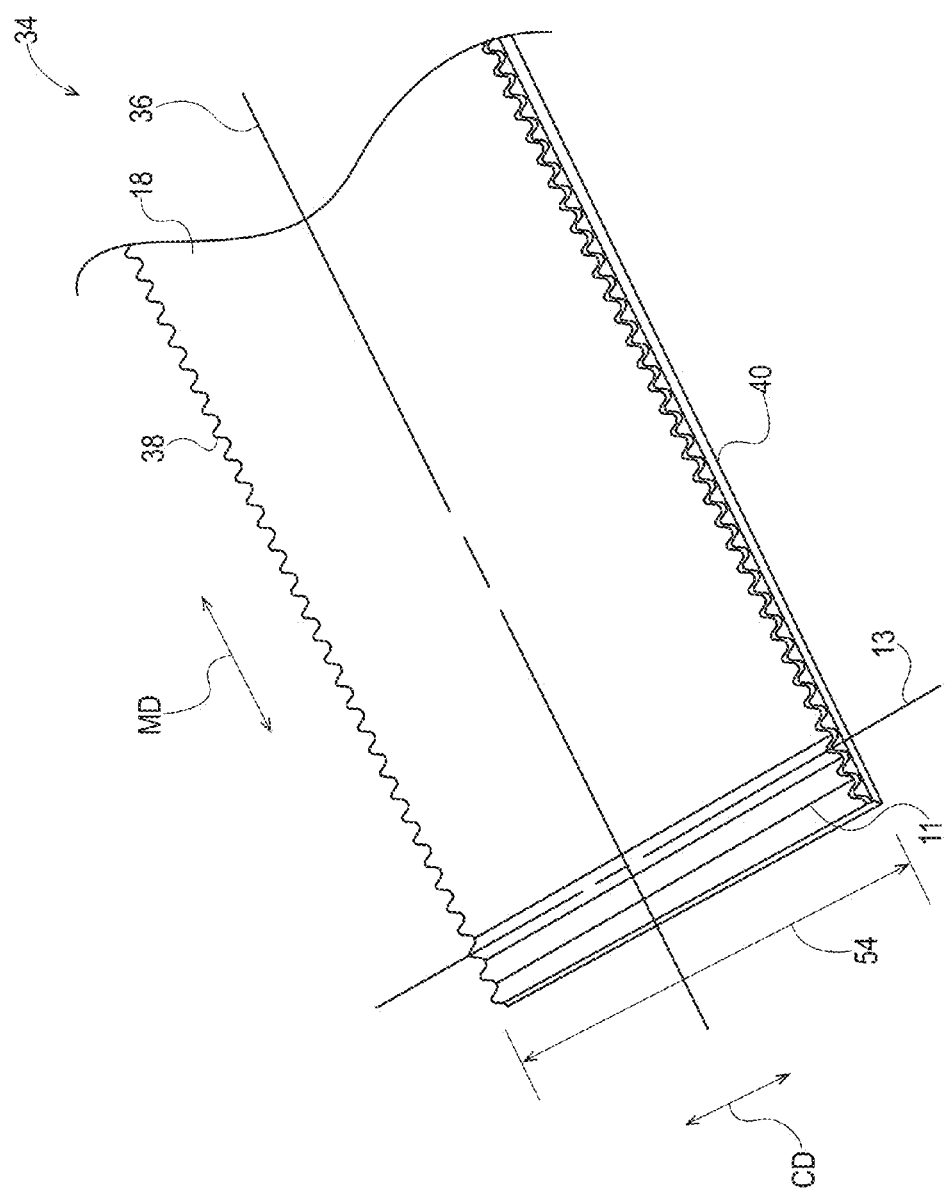
FIG. 6 is a perspective view of a strip of material suitable for making a fibrous core in accordance with one non-limiting embodiment of the present disclosure.
Figure 6A:
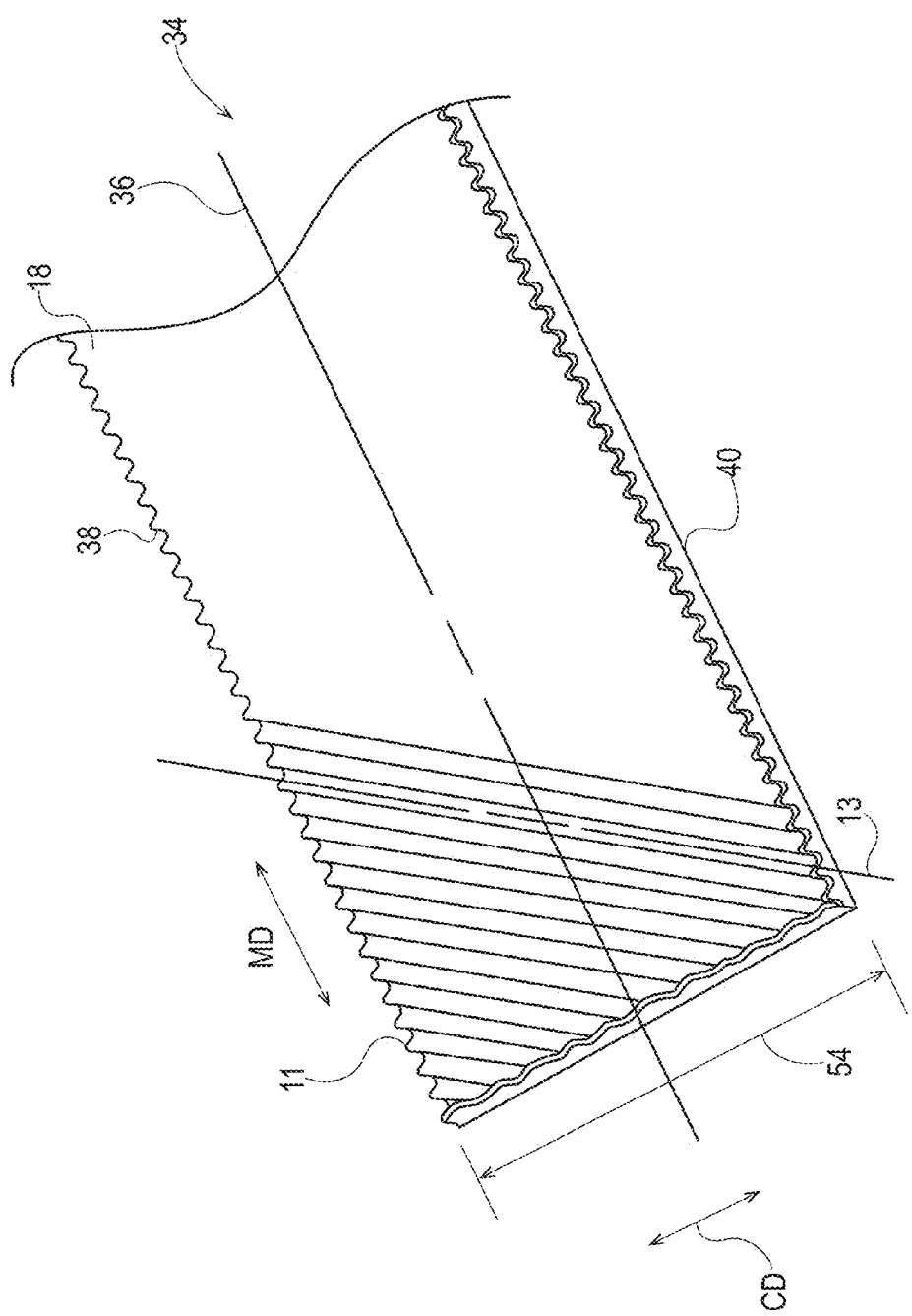

As shown in FIG. 6, for example, the single-face corrugate material 18 can be formed into a strip 34 prior to winding into a continuous fibrous core 10. The strip 34 of material has a strip axis 36 parallel to the machine direction, MD, as indicated in FIG. 6. The strip 34 further comprises a strip width 54, a first edge 38 that can be substantially parallel to the strip axis 36, and a second edge 40 that is generally opposite the first edge 38 and substantially parallel to the strip axis 36. The strip width 54 can be from about two inches to about 100 inches, depending on, for example, the desired manufacturing method of fibrous core 10, the width of the overlap 25 between wrapped layers, and the number of layers. For fibrous cores 10 of the present disclosure suitable for use as cores for rolled sanitary tissue products, such as toilet tissue and paper towels, the strip width 54 can be from about 3 inches to about 6 inches, or from about 4 inches to about 5 inches. In one embodiment, the strip 34 further comprises a plurality of flutes 11. The plurality of flutes 11 can extend in a cross machine direction, CD, which can be substantially perpendicular to the strip axis 36. In an embodiment, rather than be oriented in a cross machine direction, flutes 11 can be oriented at an angle to strip axis 36 and/or the machine direction, as shown in FIG. 6A. For example, the plurality of flutes 11 can be at an angle of about 5 degrees to about 90 degrees and/or about 20 degrees to about 75 degrees and/or about 35 degrees to about 60 degrees and/or about 45 degrees to about 55 degrees relative to the strip axis 36.

Figure 6B:
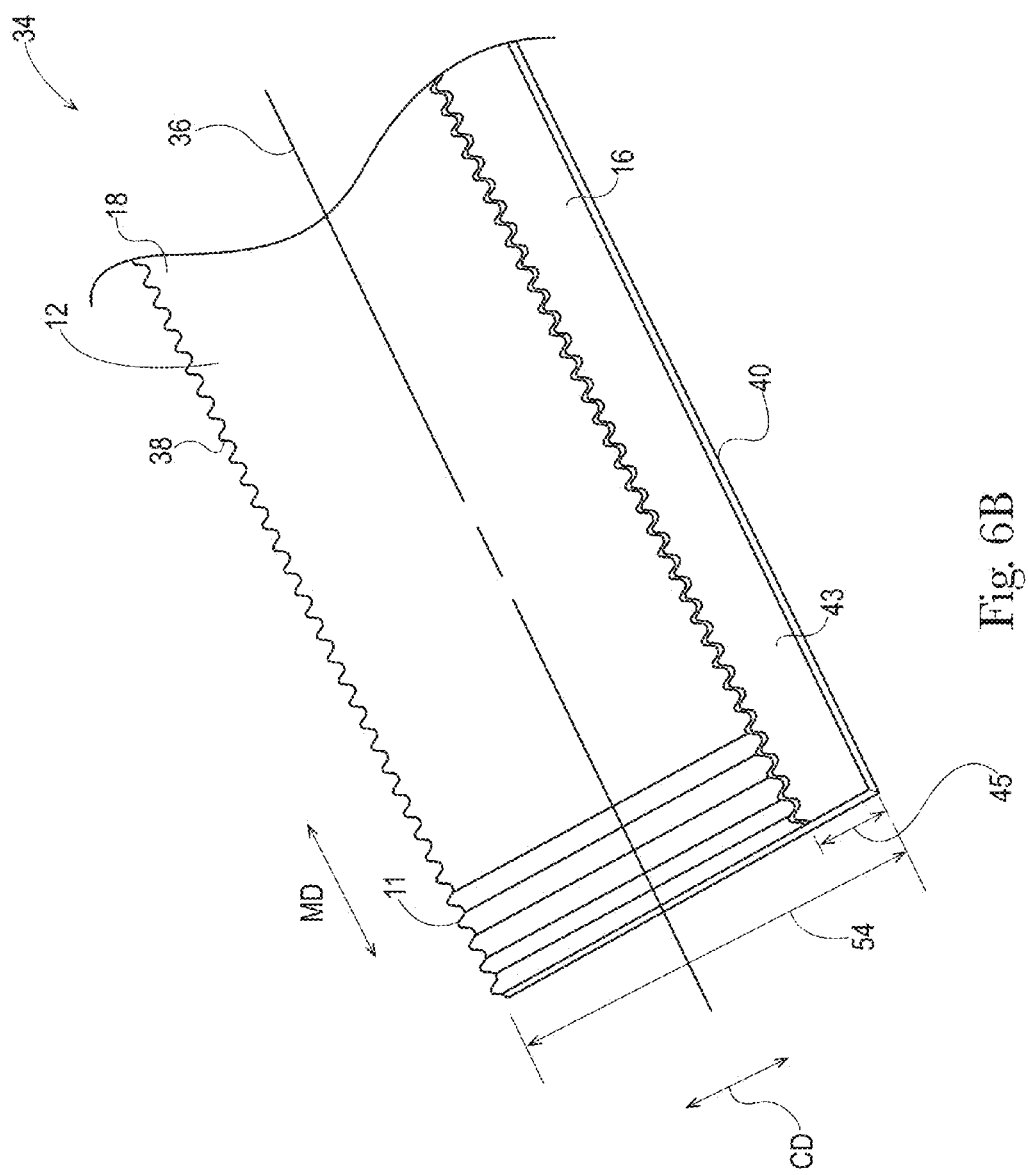
Figure 6C:
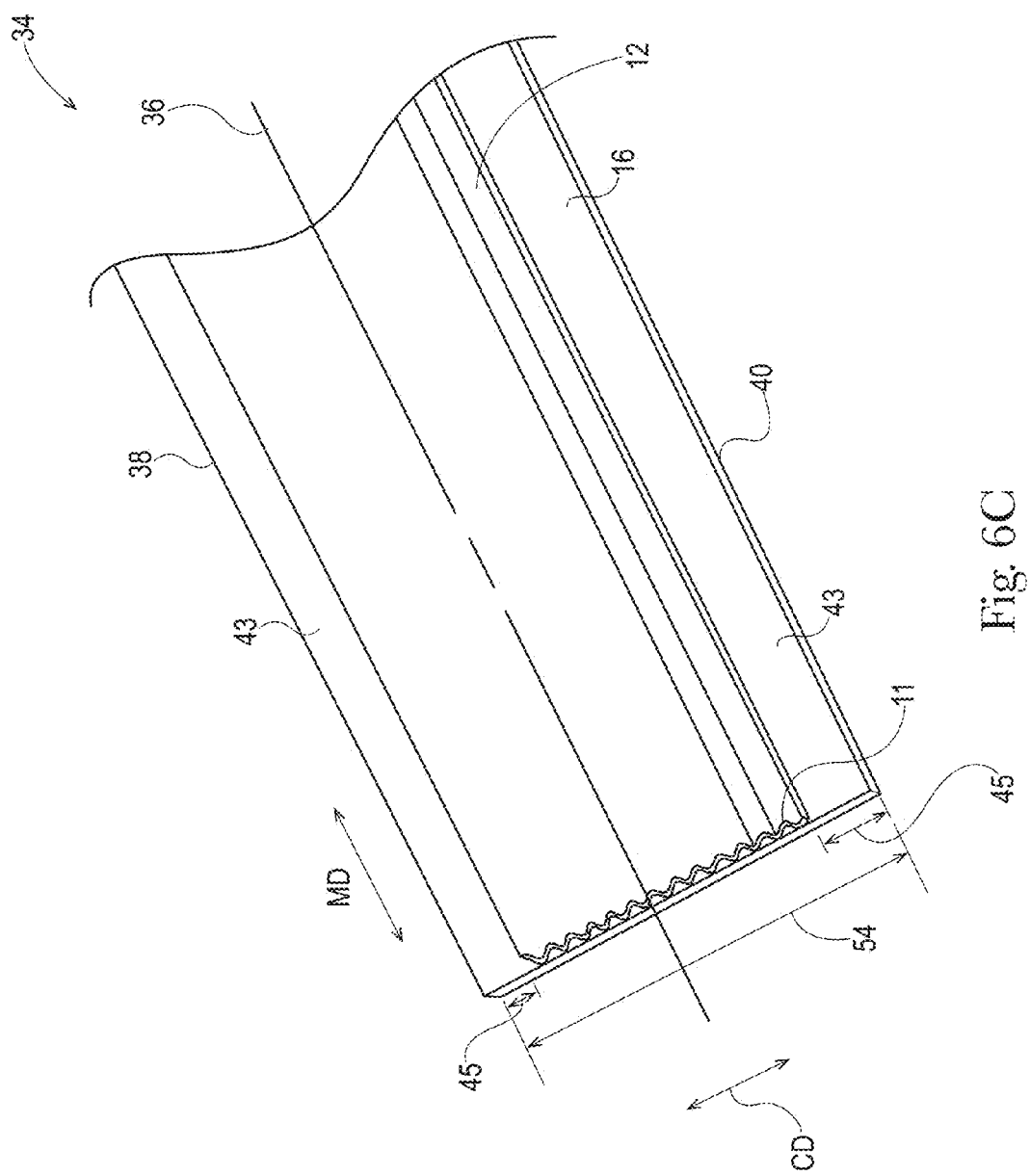
Figure 6D:
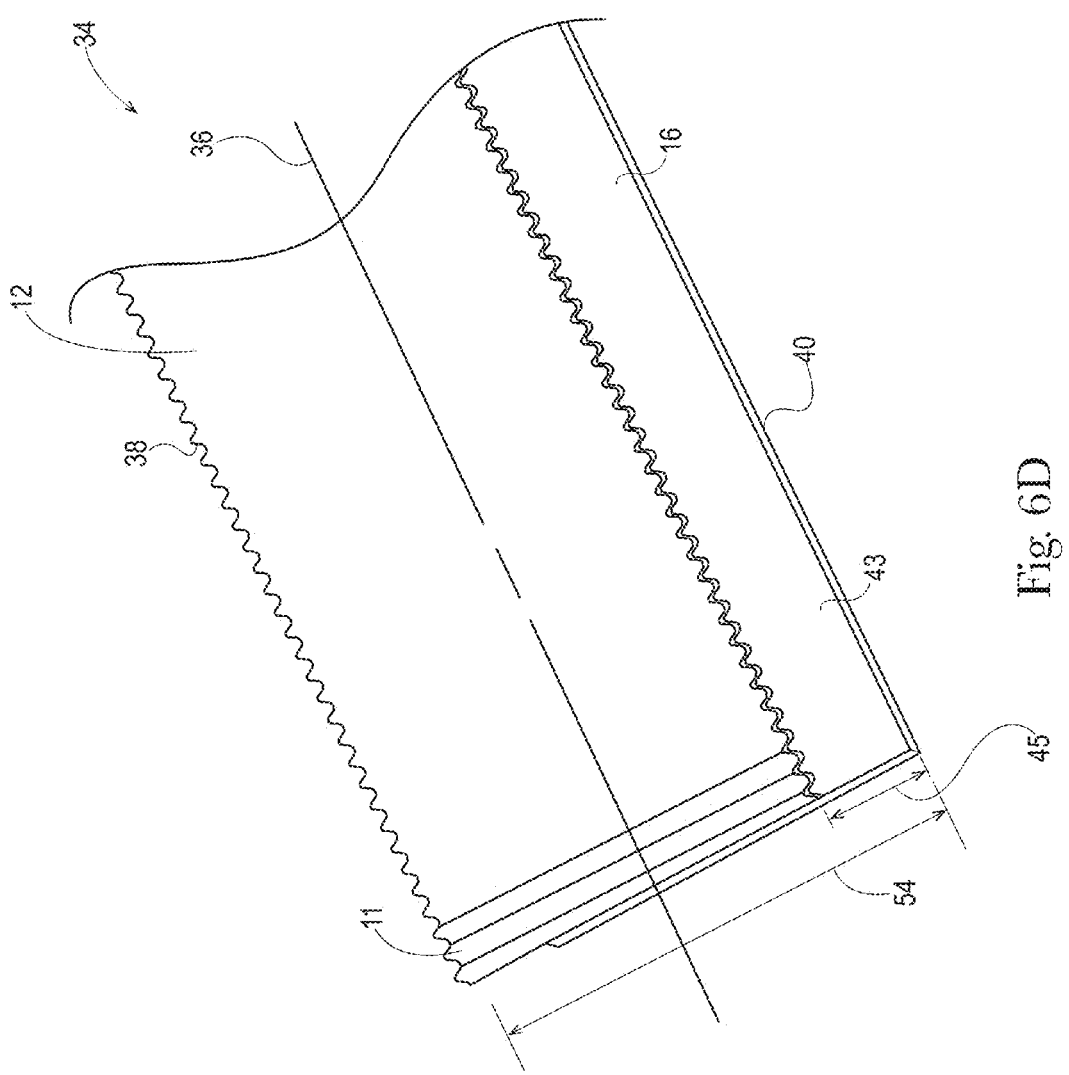

As shown in FIG. 6B, the fluted layer 12 and the liner 16 can form a strip 34 wherein the fluted layer 12 has a width less than the strip width 54 and/or the width of the liner 16. The fluted layer 12 is positioned on the liner such that there is an open portion 43 having an open portion width 45. Stated another way, the fluted layer 12 extends from the first edge 38 but stops short of the second edge 40, to form an open portion 43 having an open portion width 45. The open portion 43 can be substantially parallel to the strip axis 36 as shown, for example, in FIG. 6B. Alternatively, the open portion 43 can be at an angle to the strip axis 36, not shown. In one example embodiment, the open portion width 45 can be about equal to the overlap width 25 once the fibrous core 10 is wound. In still another embodiment, the fluted layer 12 can have a width less than the strip width 54 and/or the width of the liner 16. The fluted layer 12 can be positioned on the liner 16 such that there is an open portion 43 along both the first edge 38 and the second edge 40, as shown in FIG. 6C. In yet another embodiment, the fluted layer 12 and the liner 16 can be in staggered relation to one another such that along either the first edge 38 or the second edge 40 or both there can be an open portion 43, as shown in FIG. 6D. The open portion width 45 of one open portion 43 can be greater than, less than, or equal to the open portion width of another open portion 43. Further, in one embodiment, an open portion 43 having an open portion width 45 can be substantially perpendicular to the strip axis 36, not shown.

Figure 7A:
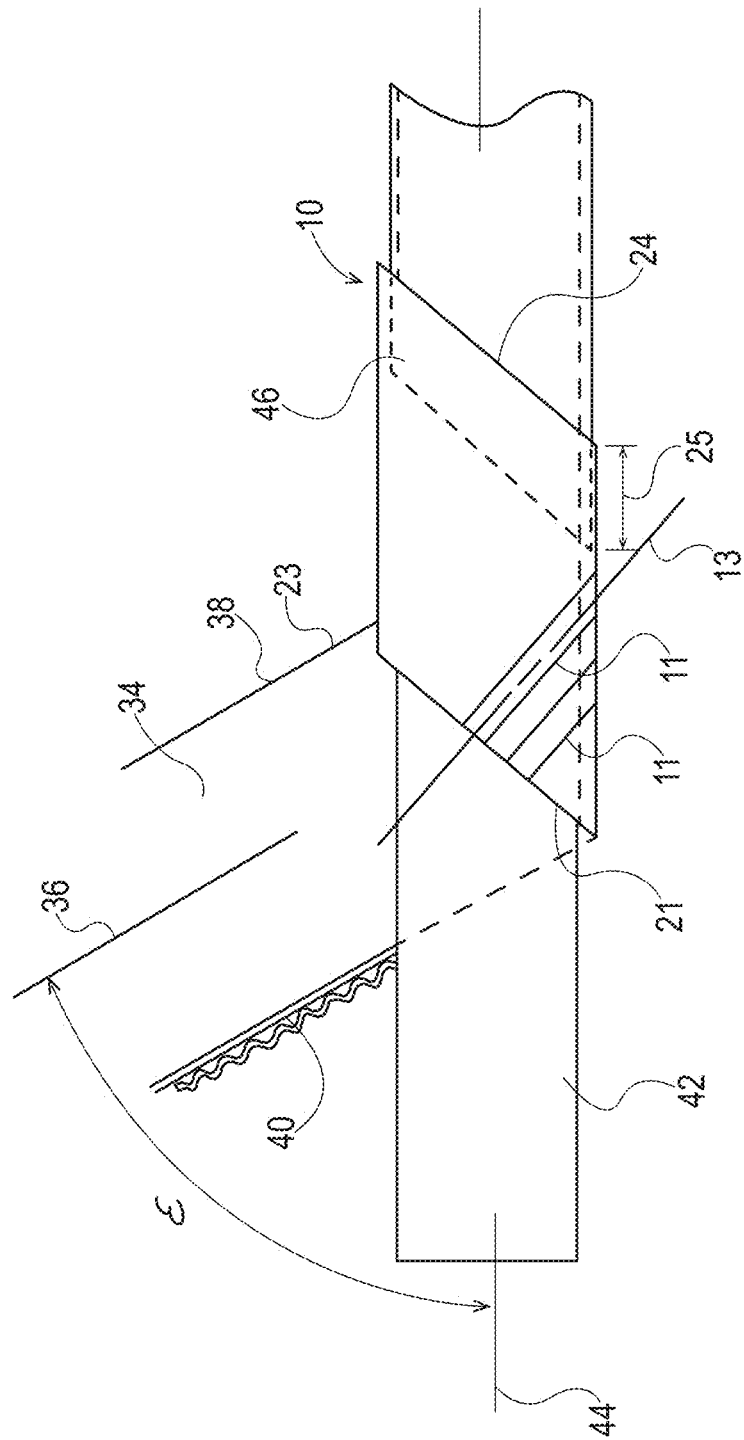
FIG. 7A is a side view of a fibrous core being formed on a mandrel in accordance with one non-limiting embodiment of the present disclosure.
Figure 7B:
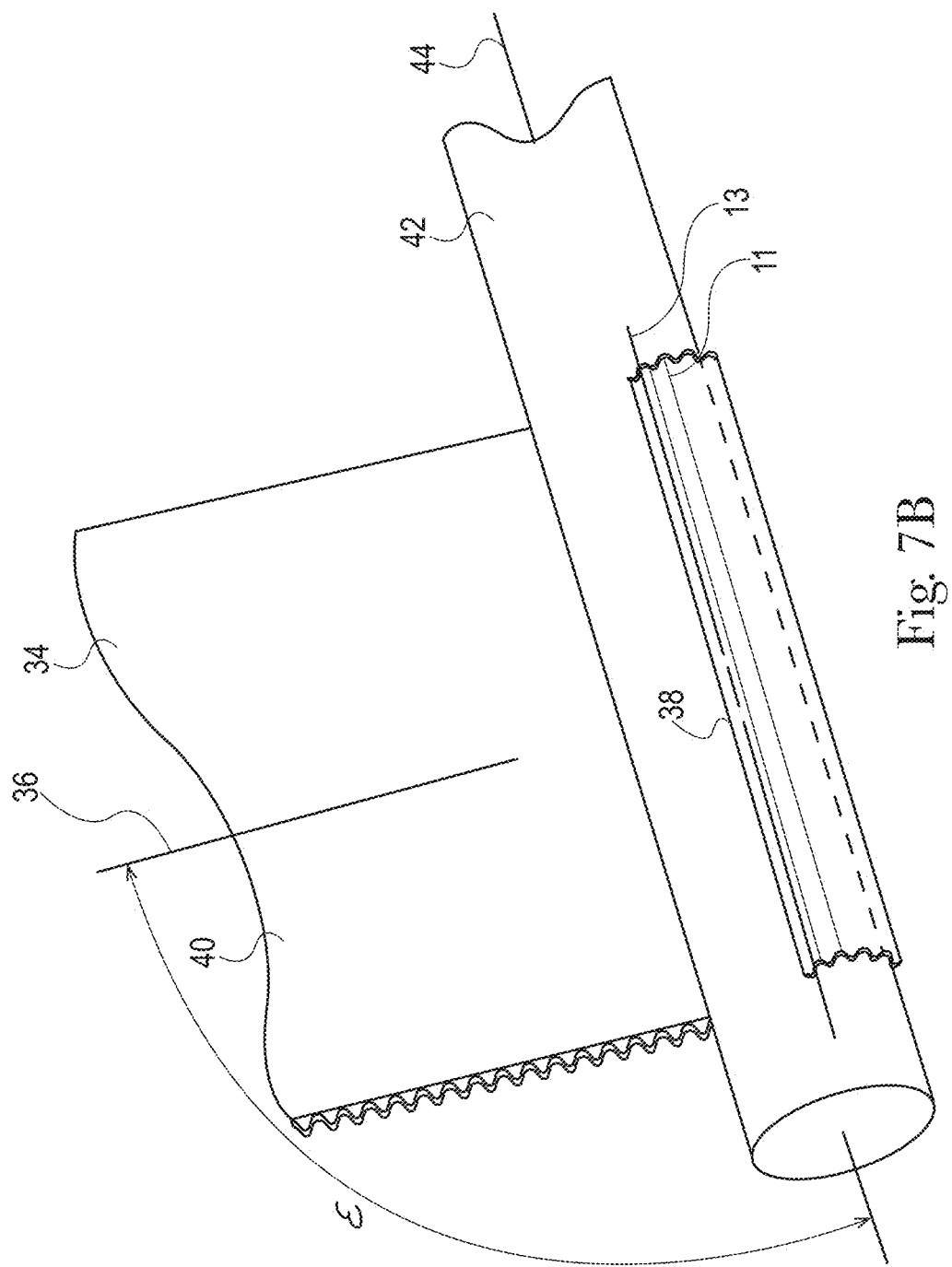
FIG. 7B is a side view of a fibrous core being formed on a mandrel in accordance with one non-limiting embodiment of the present disclosure.

The strip 34 can be wound to form a fibrous core 10, as shown in FIGS. 7A and 7B. In one embodiment, the strip 34 of single-face corrugate material 18 can be supplied from a source in strip form on a supply roll (not shown) to be unwound as it is fed onto a mandrel 42, as discussed below. Alternatively, the fluted layer 12 and the liner 16 can be each independently supplied from a source, for example, each on a separate roll, and unwound and bonded together to form a single face corrugated material 18 prior to being wound on the mandrel 42, as discussed more fully below. The single-face corrugate material 18 can be wound around a mandrel 42 which can be any suitable mandrel 42 such as a rod or spindle having a diameter substantially equal to the desired inside diameter of finished fibrous core 10. Alternatively, more than one fluted layer 12 and liner 16 can be independently supplied, adhesively bonded, and wound around the mandrel 42. Still in another embodiment, the one or more fluted layers 12 can be independently supplied and wound around the mandrel 42 and adhered to form a fibrous core 10.

The mandrel 42 can be stationary or rotated by any rotary drive means such as a motor or belt (not shown). In one example embodiment, a drive belt can wrap around and frictionally engage a portion of the wound single-face corrugate material 18 on the mandrel 42 and can be driven so as to turn and wind the single face corrugate material 18 into a continuous fibrous core 10 on the mandrel 42, in an operation as is shown, for example, in U.S. Pat. No. 7,007,887, entitled Tubular Core with Polymer Plies, with particular reference to FIG. 3 therein and the accompanying description. Alternatively, it is believed that the belt could rotate the mandrel 42 as well, or the mandrel could be independently driven and frictionally engage strip 34, thus both the mandrel 42 and the strip 34 can rotate to form a fibrous core 10.

Figure 10:
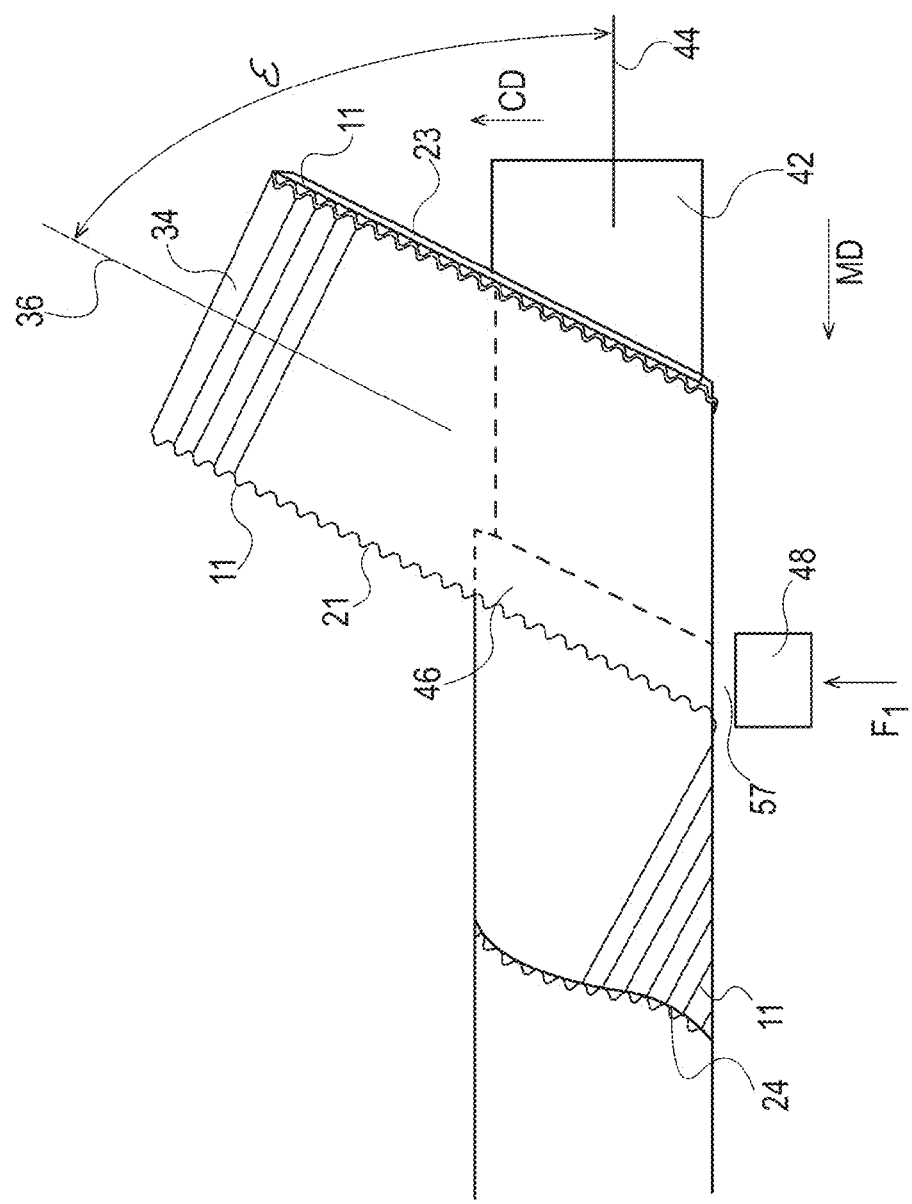
FIG. 10 is a side view of a fibrous core being formed on mandrel in accordance with one non-limiting embodiment of the present disclosure.

As shown in FIGS. 7A and 7B, the mandrel 42 can have a central longitudinal axis 44. The strip 34 can be wound at a wind angle $\epsilon$ measured from the central longitudinal axis 44 to the strip axis 36. The wind angle $\epsilon$ can be from about 0 degrees to about 90 degrees, or about 5 degrees to about 65 degrees or about 15 degrees to about 55, or about 30 degrees to about 60 degrees, or about 45 degrees, or about 43.5 degrees from the central longitudinal axis 44 to the strip axis 36, as shown in FIGS. 7A, 7B and 10.

As shown in FIG. 7A, the strip 34 can be helically wound such that a portion of the first edge 38 and a portion of the second edge 40 overlap to form an overlap portion 46 having an overlap width 25 and a seam 24, the seam 24 being the external edge interface between one layer of wound strip 34 and the underlying or abutting layer of strip 34. In one embodiment, the overlap width 25 can be from about one-eighth inch to about 3 inches. In another embodiment, the overlap width 25 can be about one-fourth to about one-half inch. Alternatively, the strip 34 can be wound such that a portion of the first edge 38 and a portion of the second edge 40 abut to form a seam 24. Generally, a seam 24 can form an oriented line of junction between wrapped layers of strip 34, and can be oriented generally parallel to or at an angle to the flute axes 13 of the plurality of flutes 11 of the strip 34 once disposed on the mandrel 42. In an embodiment, the seam 24 and the flute axis 13 of the plurality of flutes 11 once wound can be orthogonal to one another. More specifically, for example, the flute axes 13 of the plurality of flutes 11 can be from about 0 degrees to about 90 degrees or about 15 degrees to about 75 degrees or about 25 degrees to about 65 degrees or about 35 degrees to about 55 degrees from the central longitudinal axis 44 of the mandrel 42. Similarly, the seam 24 can be from about 0 degrees to about 90 degrees or about 15 degrees to about 75 degrees or about 30 degrees to about 60 degrees or about 45 degrees to about 55 degrees from the central longitudinal axis 44 of the mandrel 42. Of course, as can be understood, once the fibrous core 10 is removed from the mandrel 42, the above description of angles relative to the mandrel's central longitudinal axis 44 are equally applicable to the longitudinal core axis 20 of fibrous core 10.

As shown in FIG. 7B, wind angles ∈ of 0 degrees or 90 degrees each represent a special case in which the overlap portion will be a straight seam, such as a butt seam, sometimes referred to as a "cigarette wrap." For example, as shown in FIG. 7B, at a wind angle ∈ of about 90 degrees a fibrous core 10 is formed without a helical seam, but instead a straight seam that is substantially parallel to the central longitudinal axis 44.

Figure 8A:
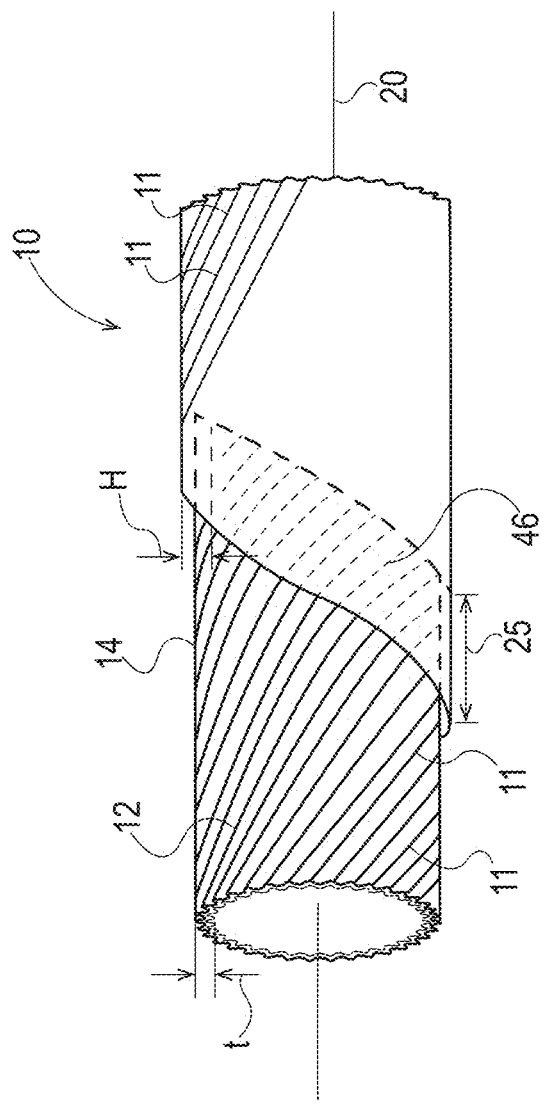
FIG. 8A is a side elevation view of a fibrous core in accordance with one non-limiting embodiment of the present disclosure.

FIG. 8A illustrates an example embodiment of a fibrous core 10 wound on a mandrel 42 as shown in FIG. 7A. The fibrous core 10 was wound at some wind angle ∈ greater than 0 degrees and less than 90 degrees such that the fibrous core was helically wound on the mandrel 42. The fibrous core 10 comprises a fluted layer 12 that can be an outer surface 14. The fibrous core 10 can comprise an overlap portion 46. A leading edge 21 of the strip 34 overlaps a trailing edge 23 as the strip 34 is helically wound on mandrel 42, forming an overlap portion 46, as shown in FIG. 7A. The height H (or, alternately, the thickness of the overlap portion) of the fibrous core 10 at the overlap portion 46 can be up to two times the thickness t of the strip 34 wound on the mandrel 42. In one embodiment, for example, the overlap portion 46 can have a height H of about two times the thickness t of the single face corrugate material 18, as shown in FIGS. 5A and 5B.

Figure 8B:
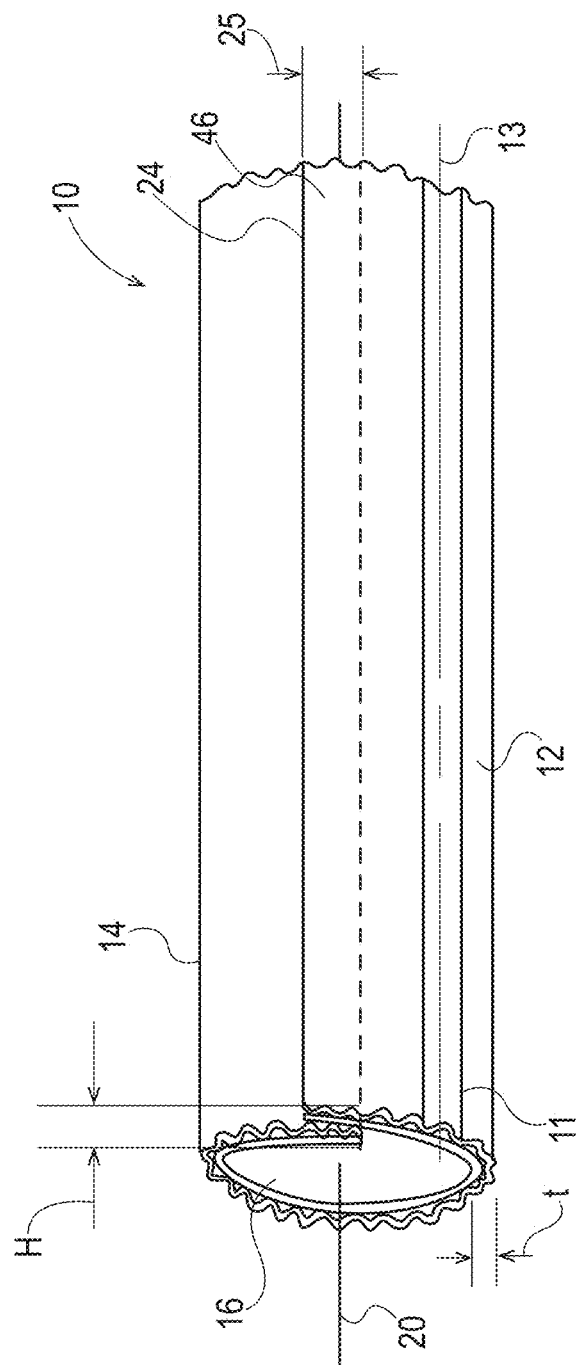
FIG. 8B is a side elevation view of a fibrous core in accordance with one non-limiting embodiment of the present disclosure.

FIG. 8B illustrates an example embodiment of a fibrous core 10 wound on a mandrel 42 as shown in FIG. 7B. The fibrous core 10 can be wound at some wind angle ∈ of either substantially 0 degrees or substantially 90 degrees. In the embodiment shown, the wind angle ∈ was about 90 degrees to produce the fibrous core 10 as shown in FIG. 8B. A first edge 38 or leading edge 21 of the strip overlaps a second edge 40 or trailing edge 23 of the strip 34 to form the overlap portion 46 and seam 24. The overlap portion 46 has an overlap width 25. The height H of the fibrous core 10 at the overlap portion 46 can be up to two times the thickness t of the strip 34 wound on the mandrel 42. In one embodiment, for example, the overlap portion 46 can have a height H of about two times the thickness t of the single face corrugate material 18, as shown in FIGS. 5A and 5B. Alternatively, the first edge 38 can abut the second edge to form a seam 24.

Each of the plurality of flutes 11 has a flute axis 13. The flute axis 13 can be parallel to the longitudinal core axis 20, as shown in FIG. 8B, or at some angle to the longitudinal core axis 20.

As illustrated in FIG. 9, the strip 34 can be compressed in at least one compressed portion 57 having a width measured from one of strip edges 38 or 40. More specifically, the plurality of flutes 11 can be compressed in a compressed portion 57, with the width of compressed portion 57 (measured perpendicularly from the first edge 38 (or leading edge 21) toward the strip axis 36 being substantially equal to the overlap width 25, such that the width of the compressed portion 57 is different by about 20% or about 10% or about 5% or about 2% or less from the overlap width 25. Alternatively, compressed portion 57 can be compressed in an area about 2% to about 20% or about 5% to about 10% greater than or less than the area of the overlap width 25. Compressed portion 57 can be compressed prior to or after being wound about the mandrel 42. For example, the fluted layer 12 can be compressed to form compressed portion 57 prior to or after being wound and/or adhesively bonded to the liner 16. Alternatively, the single-face corrugate material 18, which comprises a fluted layer 12 and a liner 16, can be compressed prior to or after being wound on the mandrel 42, as shown in FIGS. 9 and 10.

Figure 9A:
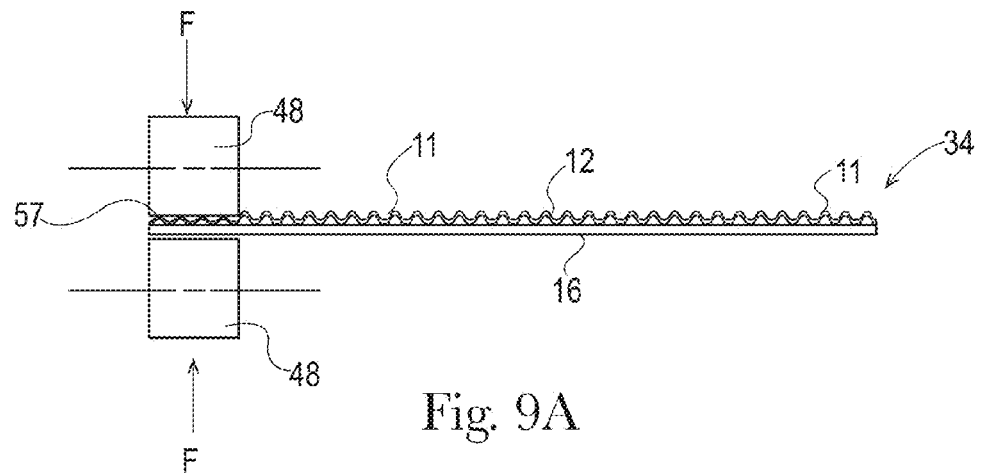
FIG. 9A is a partial cross sectional view of a compression apparatus in accordance with one non-limiting embodiment of the present disclosure.
Figure 9B:
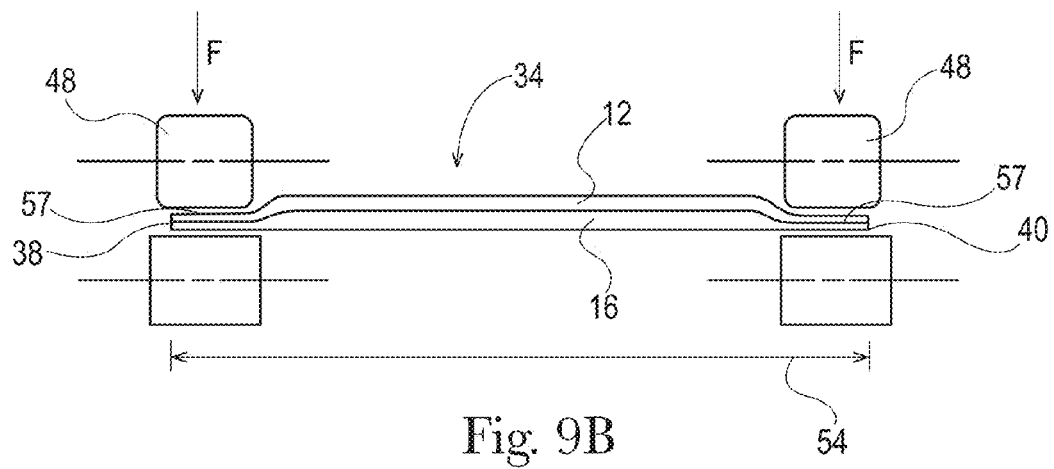
FIG. 9B is a partial cross sectional view of a compression apparatus in accordance with one non-limiting embodiment of the present disclosure.

Still referring to FIG. 9, the portion of the plurality of flutes 11 located in the overlap portion 46 can be compressed by any means known in the art such as feeding the single-face corrugate material 18 through a compression nip formed by one or more rollers 58 or pressure feet 48 (not shown in FIG. 9) that apply a normal force F to strip 34 in the region of compressed portion 57, as shown in more detail in FIGS. 9A and 9B. As illustrated in FIG. 9A, the strip 34 can be compressed in a compressed portion 57 prior to being wound about the mandrel 42. One or more pressure feet 48 or rollers 58 can apply a normal force F to the strip 34 to compress the plurality of flutes 11 in compressed portion 57. The pressure feet 48 or rollers 58 apply sufficient pressure to substantially compress one or more flutes 11 such that the height H of the overlap width 25 of the continuous fibrous core 10 is less than two times the thickness t of the strip 34.

As illustrated in FIG. 9B, the strip 34 can be compressed to create more than one compressed portion 57 prior to being wound about the mandrel 42. At least two pressure feet 48 or rollers 58 can apply a normal force F to the strip 34 to compress the plurality of flutes 11 in a first compressed portion 57 and a second compressed portion 57 along each of the first edge 38 and the second edge 40, respectively. The width of the first compressed portion 57 can be measured perpendicularly from the first edge 38 (or leading edge 21) toward the strip axis 36 and can be substantially equal to the overlap width 25. Similarly, the width of the second compressed portion 57 can be measured perpendicularly from the second edge 40 (or trailing edge 23) toward the strip axis 36 and can be substantially equal to the overlap width 25 and/or the width of the first compressed portion 57. The pressure feet 48 or rollers 58 apply sufficient pressure to substantially compress portions of one or more flutes 11 such that the height H of the overlap width 25 of the fibrous core 10, as shown in FIG. 11A, can be less than two times the thickness t of the strip 34.

An adhesive 50 can be disposed on the strip 34 prior to being wound about the mandrel 42. The adhesive 50 can be disposed on either side or both sides of the strip 34 in the area of the overlap portion 46. More specifically, the adhesive 50 can be disposed on the fluted layer 12 and/or the liner 16 in the area of the overlap portion 46. The adhesive 50 can be applied in amount sufficient to bind the strip 34 in the overlap portion 46 once it is wound about the mandrel 42. More specifically, the adhesive 50 can be applied on about 20% to 100% of the overlap width 25. For example, the adhesive 50 can be applied on about 20% of the overlap width 25 to bind the surface adjacent the leading edge 21 to the surface adjacent the trailing edge 23 in the overlap portion 46. The adhesive 50 can be applied in an amount sufficient to cover the external edge, for example, the leading edge 21 in the overlap portion 46, when the strip 34 is wound about the mandrel 42. Alternatively, in one embodiment, the adhesive 50 can be applied in an amount sufficient to cover the external edge and/or the internal edge, for example, the leading edge 21 and/or the trailing edge 23 of the wound fibrous core 10. The adhesive 50 can be a liquid or solid when applied to the strip 34. In one embodiment, the adhesive 50 can be in the form a solid strip, such as double-sided tape or heat activated adhesive strips. One or more solid strips of adhesive 50 can be present across the overlap width 25. For example, in one embodiment, the heat activated adhesive strip that is not activated can be disposed on the strip 34 prior to winding and later be active by a heat source to aid in winding of the rolled sheet product 52 about the fibrous core 10. In another embodiment, the adhesive 50 can be in the form a liquid, such as Adhesin Tack 6N74 available from Henkel or PA 3501 EN available from H. B. Fuller. The liquid adhesive 50 can be slot extruded on to the strip 34 in an amount sufficient to bind the strip 34 in the overlap portion 46. In another embodiment, the liquid adhesive 50 can be sprayed onto the strip 34 in an amount sufficient to bind the strip 34 in the overlap portion 46. In yet another example embodiment, the adhesive 50 can be applied using a gravure roll or anilox roll.

As shown in FIG. 10, the strip 34, which can comprise a single-face corrugate material 18 and/or a fluted layer 12, can be compressed in a compressed portion 57 substantially equal to the area of the overlap width 25 by a pressure foot 48 (or roller 58) pressing against mandrel 42 during the core winding process. The pressure foot 48 can abut the mandrel 42 and apply pressure to the strip 34 in the area substantially equal to the overlap width 25. The normal force F of pressure foot 48 can generally apply pressure in a direction substantially perpendicular to the machine direction, MD, and/or the mandrel 42 sufficient to compress portions of each of the plurality of flutes 11 of fluted layer 12. The pressure foot 48 can have an interacting surface that is less than, greater than, or substantially equal to the overlap width 25. In one embodiment, the pressure foot 48 can be a rubber roll that abuts the overlap portion 46 while the strip 34 is being wound about the mandrel 42. Alternatively, the pressure foot 48 can have a substantially flat surface including a surface having a coefficient of friction relative to the material of the strip 34 sufficient to allow the strip 34 to be processed without tearing or otherwise being structurally compromised. The pressure foot 48 can be concave or convex with respect to the mandrel 42; the pressure foot 48 can have a similar radius of curvature as the mandrel 42. Further, the pressure foot 48 can be moveable parallel and perpendicular to the central longitudinal axis 44 of the mandrel 42, and/or vertically. The pressure foot 48 applies enough pressure to substantially compress one or more flutes 11 such that the height H of the overlap width 25 of a wound fibrous core 10 is less than two times the thickness t of the strip 34. The pressure foot 48 can be at any location along the mandrel 42. More specifically, the pressure foot 48 can be applied at some time after or before a portion of the first side 38 or the leading edge 21 and a portion of the second side 40 or the trailing edge 23 are adhesively bonded to form the overlap portion 46.

Figure 11:
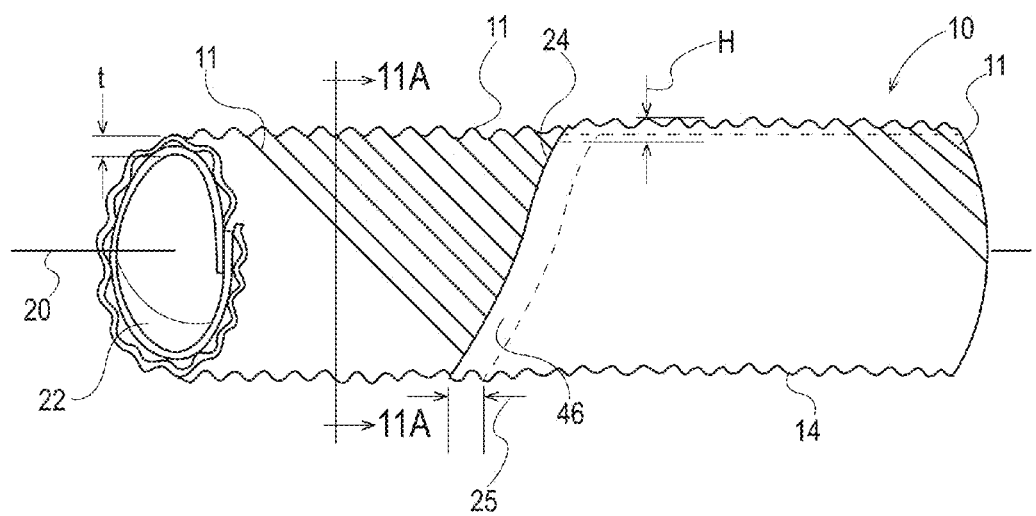
FIG. 11 is a side view of a fibrous core in accordance with one non-limiting embodiment of the present disclosure.
Figure 11A:
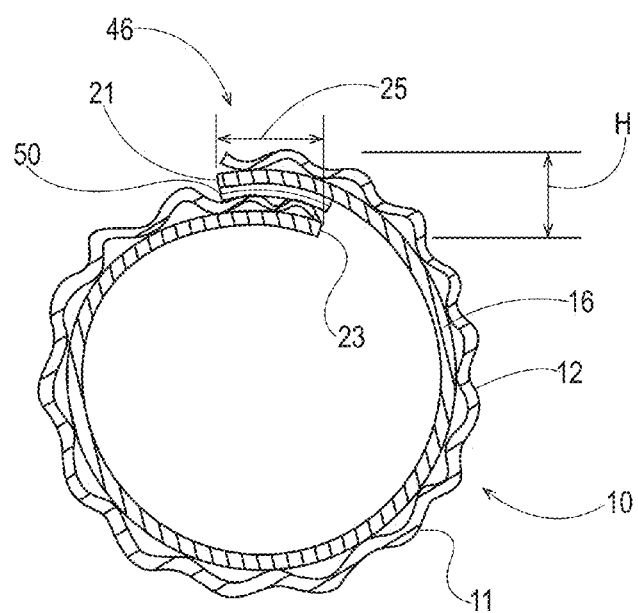
FIG. 11A is a cross sectional view of Section 11-11 of FIG. 11.

FIG. 11 illustrates an example embodiment of a fibrous core 10 that was wound about a mandrel 42 according to the description above and as shown in FIG. 9 or 10. The fibrous core 10 comprises an overlap portion 46 in which a leading edge 21 of the strip 34 overlapped a trailing edge 23 as it was wound on mandrel 42, forming an overlap width 25. The height H (or, alternatively, thickness) of the fibrous core 10 at the overlap portion 46 can be less than two times the thickness t of the strip 34 wound on the mandrel 42. More specifically, for example, the overlap width 25 can have a height H of less than about two times the thickness t of the strip 34, as shown in FIG. 6. By compressing the overlap portion 46 of overlap width 25, the outer surface 14 of the fibrous core 10 can be a substantially smooth surface across the seam 24 and outer surface 14. A relatively smooth outer surface 14 of the fibrous core 10 can provide for more uniform application of sanitary tissues products to the fibrous core. Further, the compressed overlap portion 46 can be substantially smooth and create an aesthetically appealing inner surface 22 and outer surface 14 of a fibrous core 10.

FIG. 11A illustrates a cross sectional view of the fibrous core 10 of FIG. 11 that comprises an adhesive 50. As previously disclosed, the adhesive 50 can be applied prior to winding the fibrous core 10 on the mandrel. The adhesive 50 can be present on one or both of the leading edge 21 and the trailing edge 23. Alternatively, the adhesive can be present on about 20% to about 100% of the overlap portion 46. For example, in one embodiment, the adhesive can be present on the entire width 25 of the overlap portion 46. More specifically, the adhesive 50 can extend from the leading edge 21 over the distance of the overlap width 25 to the trailing edge 23. In an alternative example embodiment, the adhesive 50 can be present on 50% of the overlap width 25 such that a portion of the overlap width 25 is substantially free of adhesive 50.

Figure 12:
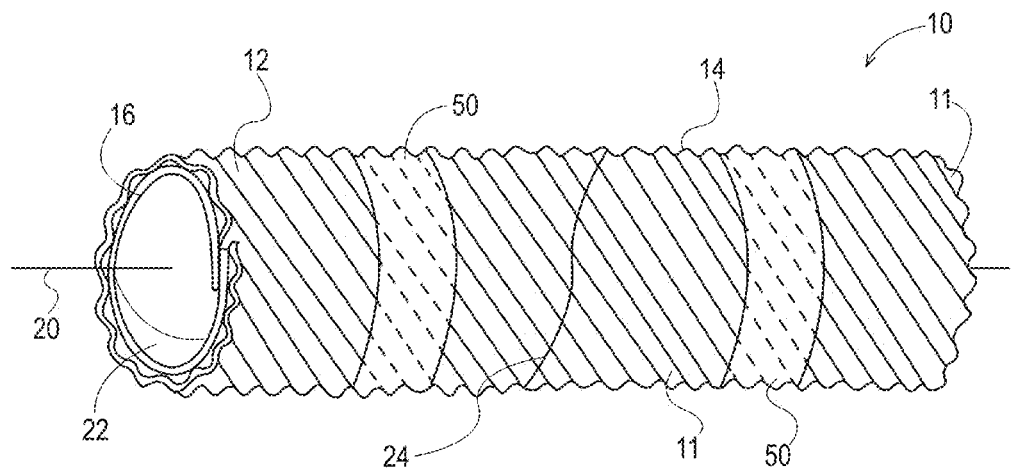
FIG. 12 is a side view of a fibrous core in accordance with one non-limiting embodiment of the present disclosure.
Figure 13:
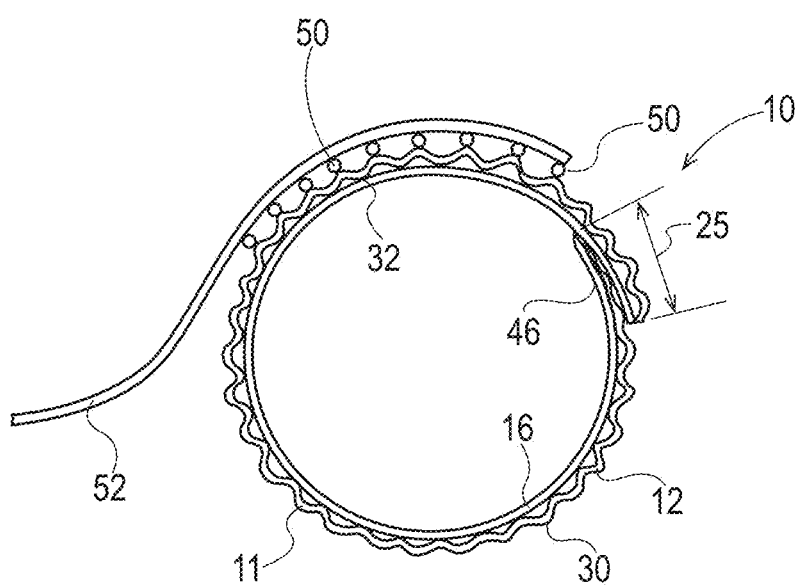
FIG. 13 is an end view of a fibrous core in combination with a rolled product in accordance with one non-limiting embodiment of the present disclosure.

As shown in FIG. 12, the fibrous core 10 can comprise an adhesive 50 for removably binding a rolled sheet product 52, rolled about the fibrous core 10, as shown in FIG. 13. The adhesive 50 can be applied in any of the aforementioned ways prior to or after winding the fibrous core 10. In one embodiment, the adhesive 50 can be applied in one or more strips circumferentially applied and separated at predetermined distances along the length 28 of the fibrous core 10 after the fibrous core 10 has been wound. More specifically, at least two adhesive strips can be circumferentially applied such that each substantially surrounds the outside surface 14 of the fibrous core 10. The adhesive 50 can be applied such that it is present on about 5% to about 100% of the outer surface 14 of the fibrous core 10.

In one embodiment, the fibrous core 10 can have a fluted layer 12 as the outer surface 14. The fluted layer 12 comprises a plurality of flutes 11. The plurality of flutes 11 can allow for a smaller amount of adhesive 50 to be applied to the fibrous core 10 while not sacrificing effectiveness, such as in winding the rolled sheet product onto the fibrous core 10. The flutes 11 can allow the adhesive 50 to be applied to the peaks 30 of the plurality of flutes 11 as shown in FIG. 13. The adhesive 50 can be applied such that it is present on substantially all of the peaks 30 on the fibrous core 10. Thus, in a given adhesive strip about 75% to about 50%, or about 30% to about 20% or about 10% to about 5% less adhesive 50 can be used to removably adhere the rolled sheet product 52 about the fibrous core 10. In addition to cost savings for the manufacturer, reducing the amount of adhesive 50 can result in greater ease in removing the rolled sheet product 52 directly in contact with the fibrous core 10. Consumers can then have the ability to use even the last sheet of rolled sheet product 52 from the fibrous core 10.

In another embodiment, the fibrous core 10 can have an outer surface 14 comprising a fluted layer 12 comprising a plurality of flutes 11. The plurality of flutes 11 can comprise an adhesive 50. The adhesive 50 can be present substantially over the entire outer surface 14 of the fibrous core 10. The adhesive 50 disposed on the outer surface 14 can be present on the plurality of flutes 11 such that both the peaks 30 and valleys 32 comprise adhesive 50. The rolled sheet product 52 can be removably adhered to the outer surface 14 such that the rolled sheet product 52 contacts only the peaks 30 of the plurality of flutes 11. Thus, despite the adhesive 50 being present over substantially the entire outer surface 14, the rolled sheet product 52 is adhered to less surface area of the fibrous core 10 allowing for greater ease in removing the last sheet of rolled sheet product 52.

Figure 12A:
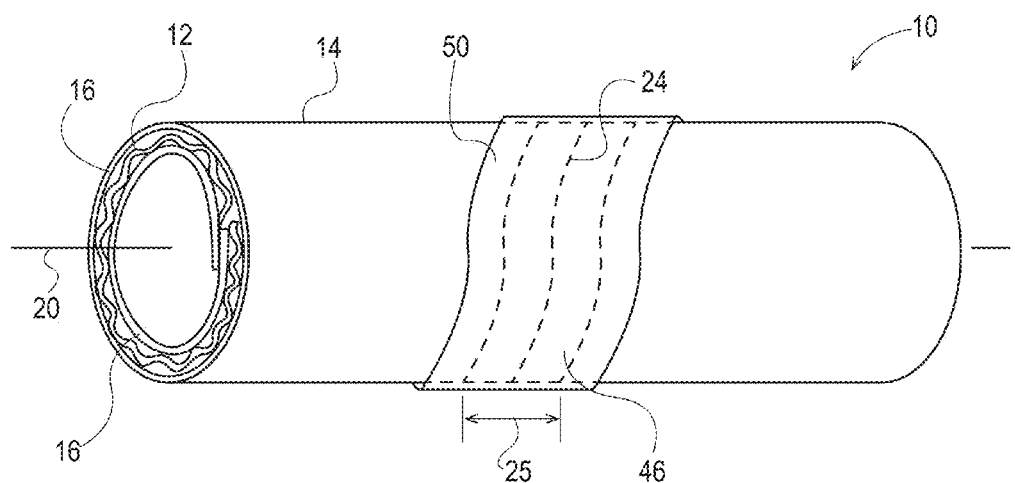
FIG. 12A is a side view of a fibrous core in accordance with one non-limiting embodiment of the present disclosure.
Figure 12B:
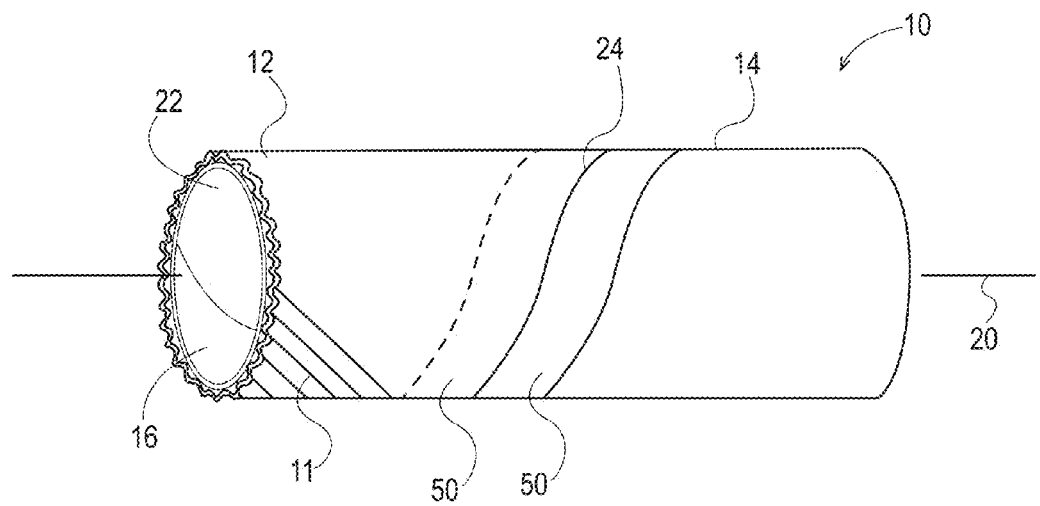
FIG. 12B is a side view of a fibrous core in accordance with one non-limiting embodiment of the present disclosure.
Figure 12C:
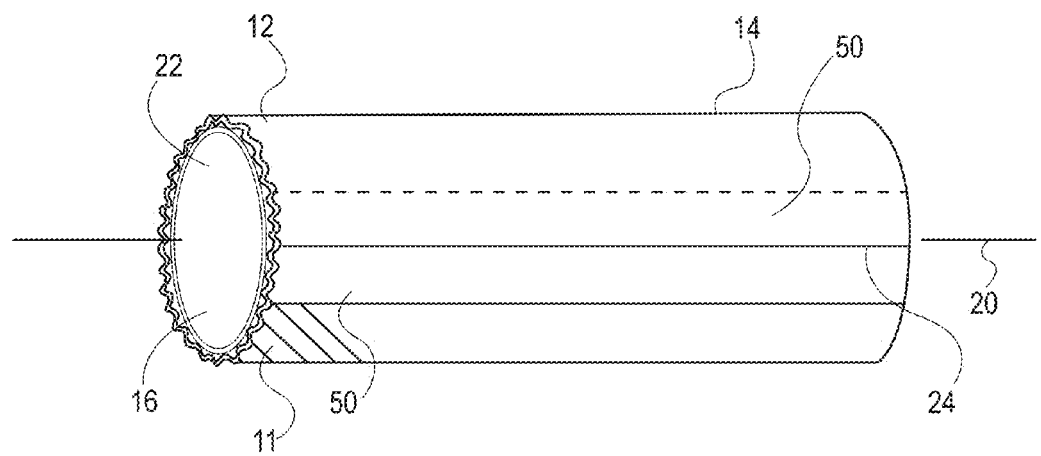
FIG. 12C is a side view of a fibrous core in accordance with one non-limiting embodiment of the present disclosure.

The adhesive 50 can be applied such that it coincides with the seam 24 of the wound fibrous core 10, as shown in FIG. 12A. The adhesive 50 can be applied to substantially cover the seam 24 of the fibrous core 10. The adhesive 50 can be applied prior to or after the fibrous core 10 is wound and in the ways previously disclosed. This additional adhesive 50 applied to a portion of the outer surface 14 of the fibrous core 10 can result in less adhesive 50 being applied to bind the overlap portion 46 of the fibrous core 10. Alternatively, as shown in FIGS. 12B and 12C, the adhesive 50, can bind the overlap portion 46 and removably bind the rolled sheet product 52. Thus, the adhesive 50 can be applied prior to winding the strip 34. The adhesive 50 can be applied on the strip 34 such that it extends beyond at least one of the first edge 38 and the second edge 40 and perpendicular to and away from the strip axis 36. The wound fibrous core 10 can have adhesive 10 disposed between the leading edge 21 and the trailing edge 23 in the overlap portion 46 and extending from the external edge of the overlap portion 46 or the seam 24 on the outer surface 14 of the wound fibrous core. The amount of adhesive 50 that can extend beyond the seam 24 is sufficient to removably bind the rolled sheet product 52 to the fibrous core 10 for further processing and consumer use, such as winding, shipping, and dispensing. The adhesive 50 can be applied such that the portion of adhesive that binds the overlap portion is activated at the time of winding, for example by heat, steam, or liquid, and the portion of adhesive that extends from the seam 24 on the outer surface 14 of the fibrous core 10 is not activated until just prior to the rolled sheet product 52 being removably bound to the fibrous core 10.

FIG. 13 illustrates an end view of a fibrous core 10 comprising a rolled sheet product 52 removably wound on the fibrous core 10. The rolled sheet product 52 can be removably adhered to the fibrous core 10 with an adhesive 50. In one embodiment, the adhesive 50 can be disposed on the peaks 30 and/or the valleys 32 of the fluted layer 12 on the outer surface 14 of the fibrous core 10. The rolled sheet product 52 can be rolled onto the outer surface 14 comprising adhesive 50. The rolled sheet product 52 can be rolled onto the fibrous core 10 such that it substantially contacts only the peaks 30 of the fluted layer 12. The contact area of the rolled sheet product 52 directly contacting the flutes of the fluted layer 12 depends on the frequency and shape of the flutes. For example, in one embodiment, the fibrous core 10 comprises a fluted layer 12 including F-flutes such that about 20% to about 60% of the area of the rolled sheet product 52 disposed around the fibrous core 10 contacts the outer surface 14. The contact area of the rolled sheet product 52 to the outer surface 14 depends in part on the amount of force used to wind the rolled sheet product 52. Thus, the consumer can remove the last sheet of the rolled sheet product 52 more easily because the rolled sheet product 52 can be in contact with less area of the outer surface 14 comprising adhesive 50.

Alternatively, in one embodiment, at least a portion of the peaks 30 can comprise an adhesive 50 and, in contrast, the valleys 32 can be substantially free of adhesive 50. Generally, applying adhesive 50 to only the peaks 30 of the flutes 11 can cause a reduction in the amount of adhesive 50 applied to the fibrous core 10 which can result in a total cost reduction of the fibrous core 10. Due to the placement of the adhesive 50 on the peaks of the flutes 11, the rolled sheet product 52 can be substantially free of interaction with the valleys 32 of the fluted layer 12. Stated another way, the rolled sheet product 52 can generally interact with only the peaks 30 of the fluted layer 12 which can allow for ease of consumer removal of the last sheet of rolled sheet product 52.

Figure 14:
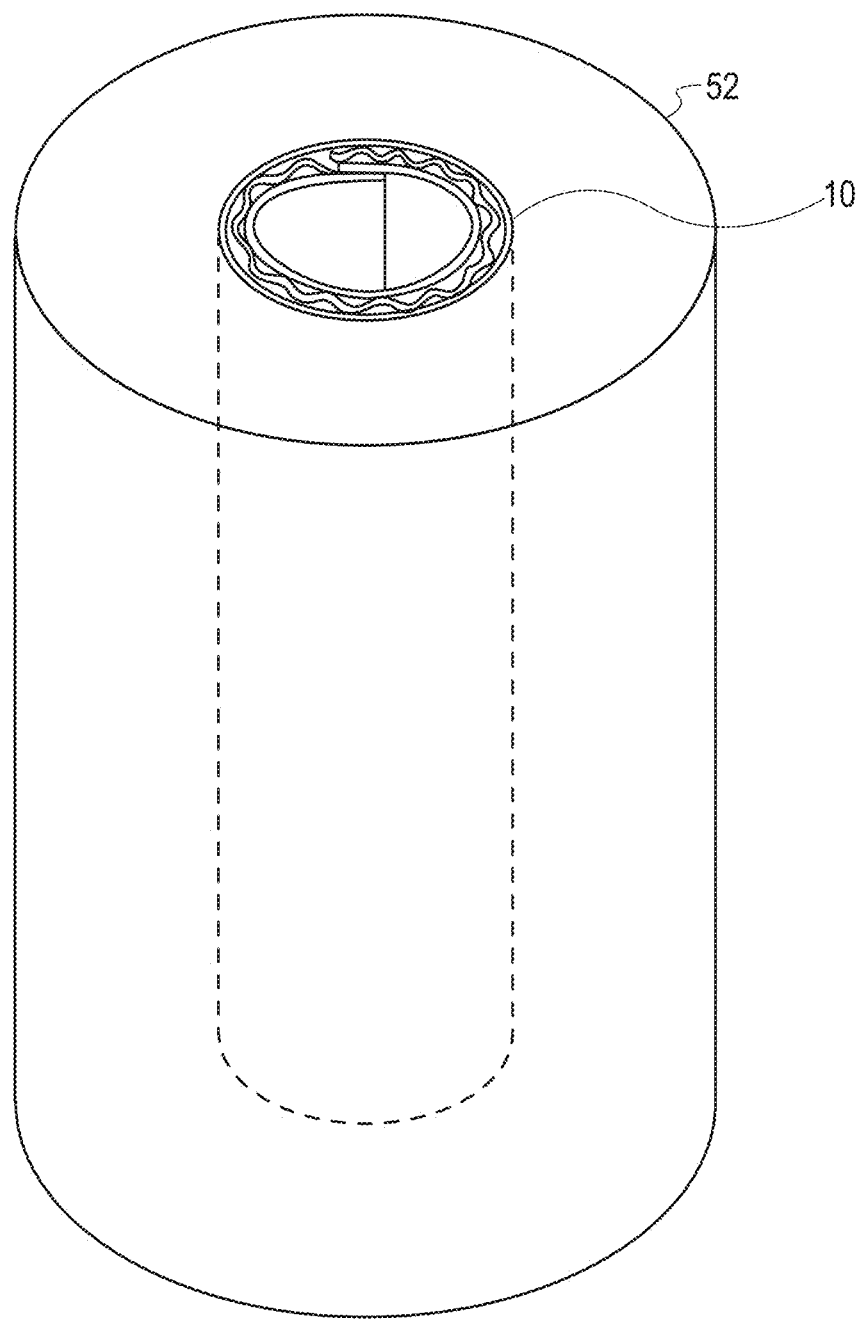
FIG. 14 is a perspective view of a fibrous core in combination with a rolled product in accordance with one non-limiting embodiment of the present disclosure.

As illustrated in FIG. 14, the rolled sheet product 52 can be removably rolled about the fibrous core 10. FIG. 14 shows a typical roll wherein the sheet product 52 is bath tissue or paper towels, for example. The fibrous core 10 supports the rolled sheet product 52 during processing, storage, shipping, and delivery. Further, the fibrous core 10 allows the rolled sheet product 52 to be stored on a dispensing device for consumer use.

In another embodiment, the fibrous core 10 comprises a scent composition, not shown, that has a scent, such as a perfume, fragrance-emitting substance, etc. The scent composition can be disposed on the fibrous core 10. More specifically, the scent composition can be disposed between the fluted layer 12 and the liner 16. Alternatively, the scent composition can be disposed on a portion of the plurality of flutes 11 such that the scent composition can be on at least a portion of the outer surface 14 and/or on the inner surface 22 and/or between the fluted layer 12 and the liner 16. In an alternate embodiment, the scent composition can be disposed on one or more fibers of the fibrous structure during the papermaking process of the fluted layer 12 and/or the liner 16. The scent composition can be any fragrance appealing to the consumer such as the scents disclosed in U.S. Pat. No. 7,850,038. The scent composition can be any odor neutralizing material or a scent masking agent such as cyclo dextranes and/or other compositions used in FEBREZE branded products.

Printing/Embossing

Figure 15:
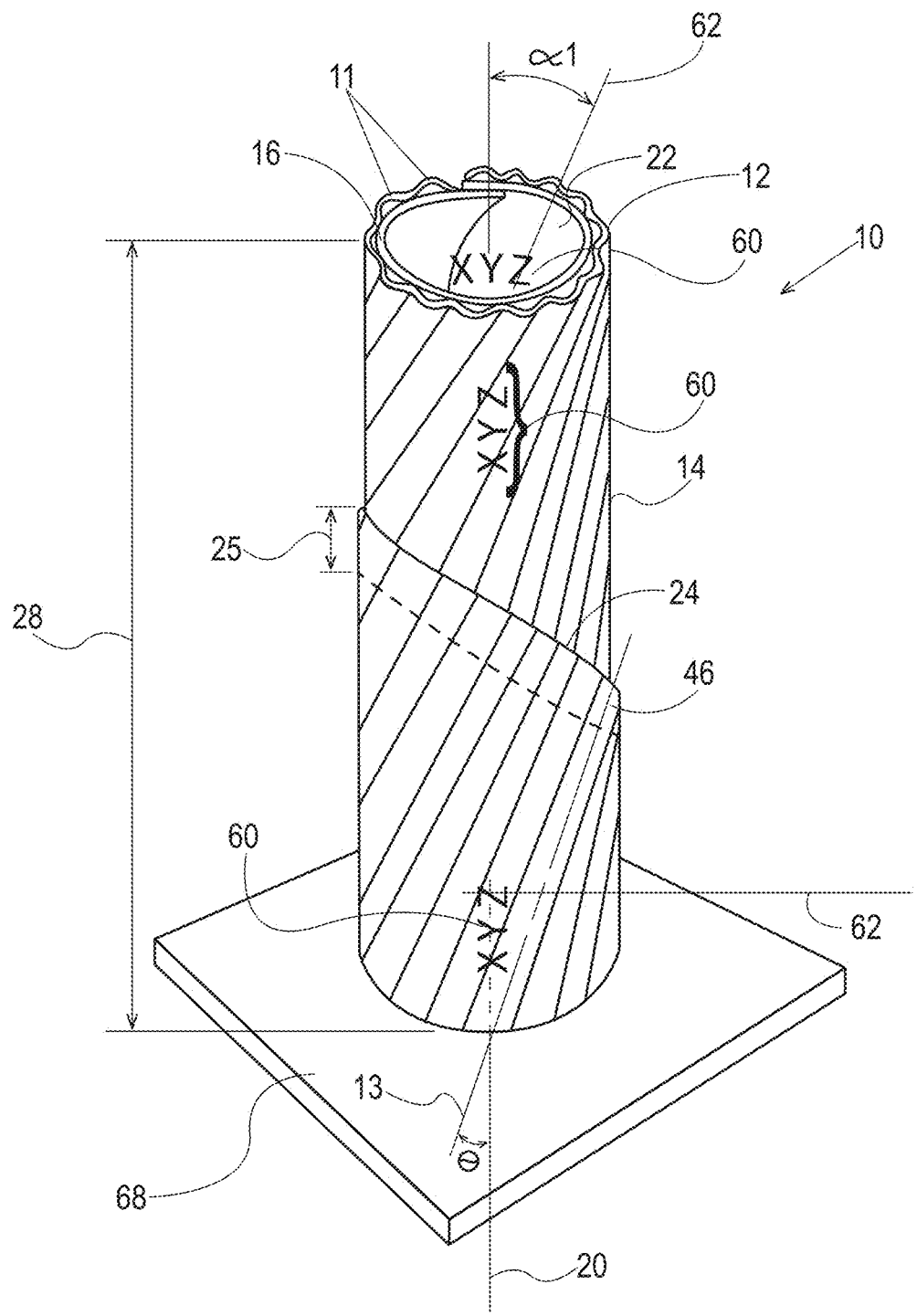
FIG. 15 is a perspective view of a fibrous core of the present disclosure in a shipping position.

As described above, the fibrous core 10 of the present disclosure can comprise one or more fluted layers 12 and/or one or more liners 16 wound to form a core structure having a central longitudinal axis 20, an inner surface 22, and an outer surface 14. The inner surface 22 defines a first open end 17 and a second open end, opposite the first open end, having a length 28 therebetween. As shown in FIG. 15, the fibrous core 10 can comprise at least one indicia 60 disposed thereon within the length 28 of the fibrous core 10. The at least one indicia 60 can comprise one or more letters, words, or symbols. The one or more indicia 60 can be embossed or printed on at least one of the outer surface 14 and/or inner surface 22. The outer surface 14 can comprise a fluted layer 12 or a liner 16. Similarly, the inner surface 22 can comprise a fluted layer 12 or a liner 16. In one embodiment, the one or more indicia 60 can be positioned at a reading orientation. Generally, a reading orientation for indicia is any angle at which a letter, word, or symbol is positioned with respect to a reader such that it is in its intended orientation to be read or interpreted by a consumer when the core is used by the consumer. Thus, for example, in FIG. 15, the letters "XYZ" on inner surface 22 are at a reading orientation for a reader handling a fibrous core 10 wound with rolled product in a position as shown in FIG. 15. As a reader holds such a roll in such a "vertical" orientation as also shown, for example, in FIG. 14, the letters "XYZ" are in an upright, generally horizontal orientation with respect to a reader. Likewise, both sets of the letters "XYZ" on the outer surface 14 as shown in FIG. 15 are in a reading orientation for a reader looking at a horizontally dispensed toilet tissue after the last sheet has been removed from the fibrous core 10.

In one embodiment, the fibrous core 10 can be positioned in a shipping position, that is, in a substantially vertical orientation with respect to a horizontal planar surface 68, such as shipping pallet, as shown in FIG. 15, such that the outer surface 14 and/or the central longitudinal axis 20 can be substantially perpendicular to the horizontal planar surface 68. When the fibrous core 10 is positioned in the shipping position, the indicia 60 on the inner surface 22 can be positioned at a reading orientation. More specifically, for example, the indicia 60 can comprise one or more letters, words, or symbols oriented such that a consumer can read these on the inner surface 22 of the fibrous core 10 when the core 10 is oriented vertically. Stated another way, the indicia 60 on the inner surface 22 of the fibrous core 10 in the shipping position can be positioned at an orientation that is substantially parallel to the longitudinal core axis 20 of the fibrous core 10. In another embodiment, the reading orientation of the indicia 60 on the inner surface 22 can be at an angle α1 from a line parallel to the longitudinal core axis 20 of the fibrous core 10. The angle α1 can be determined by bisecting the letter, word, or symbol with a bisecting line 62, which bisects the letter word or symbol at about a right angle, and measuring the angle between the longitudinal core axis 20 and the bisecting line 62. The bisecting line 62 can be a straight line that divides the word, letter, or symbol into substantially two equal parts and can be positioned so that the line is perpendicular to the traditional reading orientation of the letter, word, or symbols. In one embodiment, the angle α1 can be from about 0 degrees to about 60 degrees or about 0 degrees to about 45 degrees.

Figure 16:
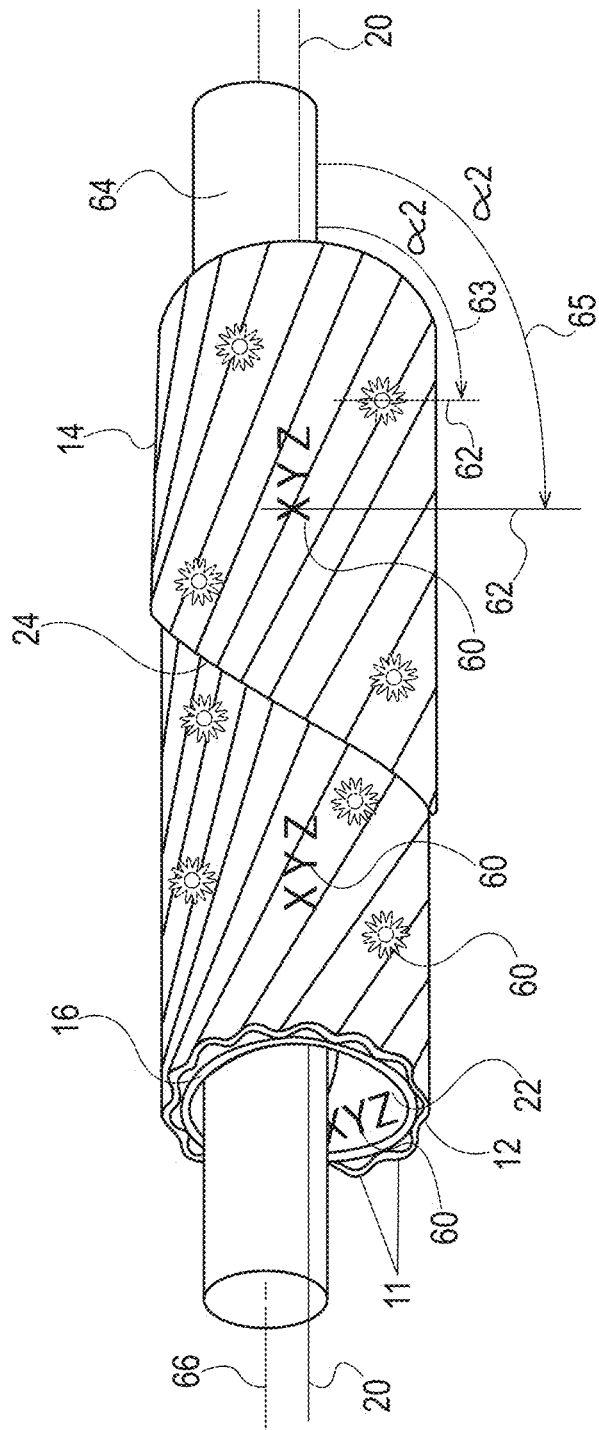
FIG. 16 is a perspective view of a fibrous core of the present disclosure in a dispensing position.

A fibrous core 10 positioned in the shipping position can comprise one or more indicia 60 on the outer surface 14, as shown in FIGS. 15 and 16. The one or more indicia 60 on the outer surface 14 of the fibrous core 10 in the shipping position can be at some position other than a reading orientation, as shown in FIG. 15. For example, as shown in FIG. 15, the one or more indicia 60 can comprise letters, words or symbols such that a line 62 that bisects the individual indicia (as described above) can be substantially perpendicular to the central longitudinal axis 20.

Alternatively, in one embodiment, the one or more indicia 60 on the outer surface 14 can be positioned in a reading orientation such that the one or more indicia 60, either individually or as a string, is positioned substantially parallel to the longitudinal core axis 20, as described in more detail with reference to FIG. 16.

In another example embodiment, the fibrous core 10 can be positioned in a dispensing position, as shown in FIG. 16, such that the outer surface 14 substantially surrounds a dispenser 64 having a dispenser axis 66. The fibrous core 10 can be in a dispensing position such that its central longitudinal axis 20 is substantially parallel to the dispenser axis 66 of the dispenser 64. The outer surface 14 can comprise one or more indicia 60 positioned at a reading orientation, such that a bisecting line 62, which bisects the indicia 60, can be substantially perpendicular to the longitudinal core axis 20 of the fibrous core 10 in the dispensing position or the dispenser axis 66. More specifically, the bisecting line 62 of one or more indicia 60 can be substantially perpendicular to the longitudinal core axis 20 of the fibrous core 10. Alternatively, the one or more indicia 60 can be positioned at angle α2 of about 10 degrees to about 170 degrees and/or about 45 degrees to about 135 degrees and/or about 75 degrees to about 105 degrees clockwise from the longitudinal core axis 20 as indicated by directional arrows 63 and 65 in FIG. 16. In an embodiment, α2 can be about 90 degrees. The one or more indicia 60 on the outer surface 14 can be revealed when the consumer dispenses the final sheets of the rolled sheet product 52. Thus, the rolled sheet product can substantially conceal the indicia 60 on the outer surface 14 of the fibrous core 10 until the final sheets of the rolled product are dispensed. In this manner, a consumer can be reminded of the brand identity of the rolled product just used. A consumer, for example, can be reminded of which brand to repurchase to replace the rolled product just finished.

In another example embodiment, the fibrous core 10 can comprise one or more indicia 60 including at least one non-letter symbol, as shown in FIG. 16. The symbol can be at a reading orientation independent of whether the fibrous core 10 is positioned at a shipping position or a dispensing position or any other position. A symbol can lack a traditional reading orientation as would be understood by one of ordinary skill in the art. For example, the symbol can be of such a shape that the interpretation or readability of the symbol does not depend on its orientation on the fibrous core 10. In one embodiment, for example, the one or more indicia 60 can comprises a symbol such as one or more flowers, as shown in FIG. 16. A consumer's interpretation that the symbol is a flower can be made independent of the position of the fibrous core 10. Thus, the fibrous core 10 can be positioned at any angle to a horizontal planar surface and the symbol can be said to be in a reading orientation.

In still another embodiment, the orientation of the one or more indicia 60 on the outer surface 14 can be related to the orientation of the one or more indicia 60 on the inner surface 22. Independent of the orientation of the fibrous core 10, the fibrous core 10 can comprise one or more indicia 60 positioned at some orientation. For example, the indicia 60 on the outer surface 14 of the fibrous core 10 can be in the same orientation as the indicia 60 on the inner surface 22 of the fibrous core 10. Similarly, the indicia 60 on the outer surface 14 of the fibrous core 10 can be in a different orientation than the indicia 60 on the inner surface 22 of the fibrous core 10. In one embodiment, the one or more indicia on the outer surface 14 can be in a reading orientation while the one or more indicia on the inner surface 22 can be in a position other than a reading orientation. In another example embodiment, the one or more indicia on the outer surface 14 and the one or more indicia on the inner surface 22 can both be in a reading orientation. In still another embodiment, the one or more indicia on the outer surface 14 can be at a position other than a reading orientation while the one or more indicia on the inner surface 22 can be at a reading orientation. In yet another embodiment, at least one of the one or more indicia 60 on the outer surface 14 and the inner surface 22 can be in a reading orientation when the fibrous core 10 is in a shipping orientation. In another embodiment, at least one of the one or more indicia 60 on the outer surface 14 and the inner surface 22 can be in a reading orientation when the fibrous core 10 is in a dispensing orientation.

Figure 17:
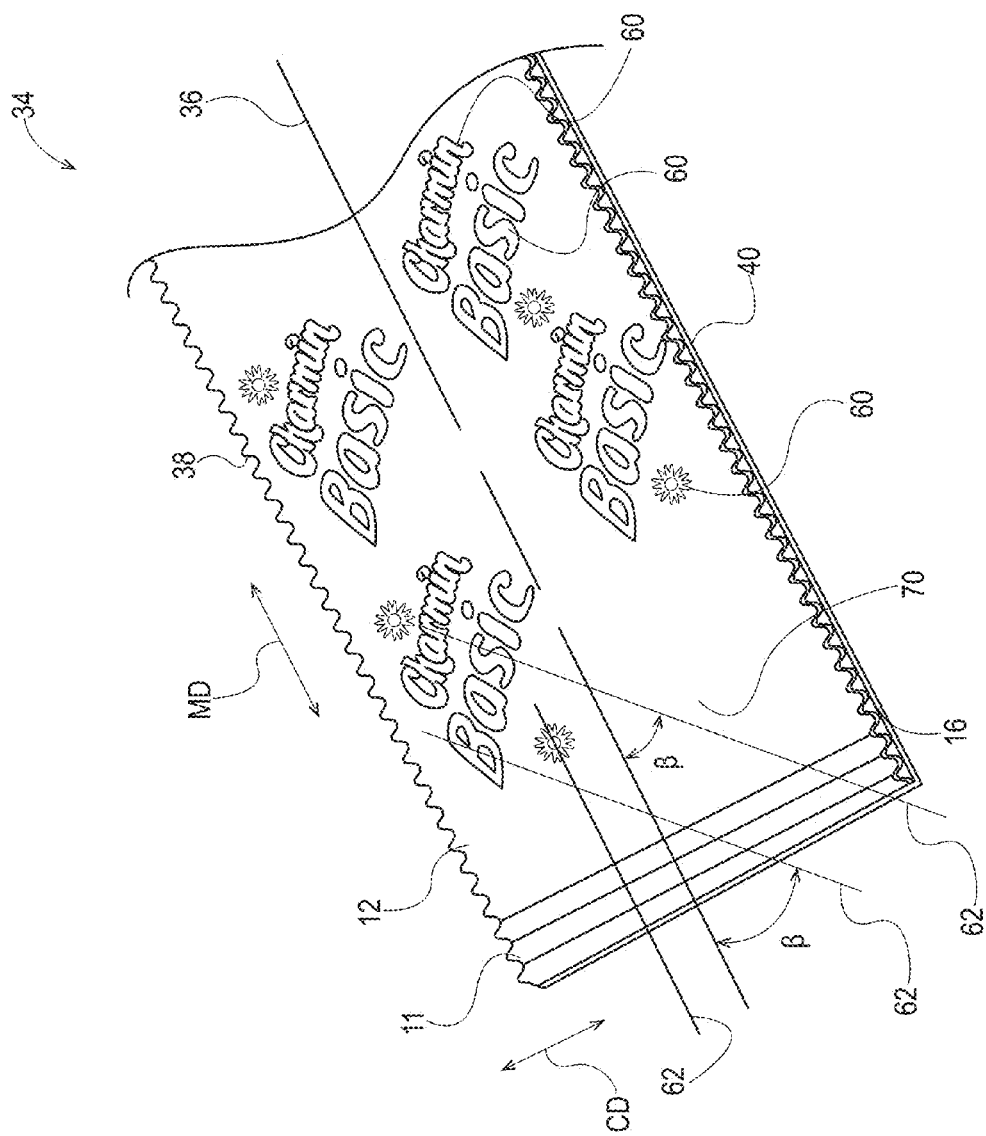
FIG. 17 is a perspective view of a strip of material for winding into a fibrous core of the present disclosure having indicia thereon.
Figure 18:
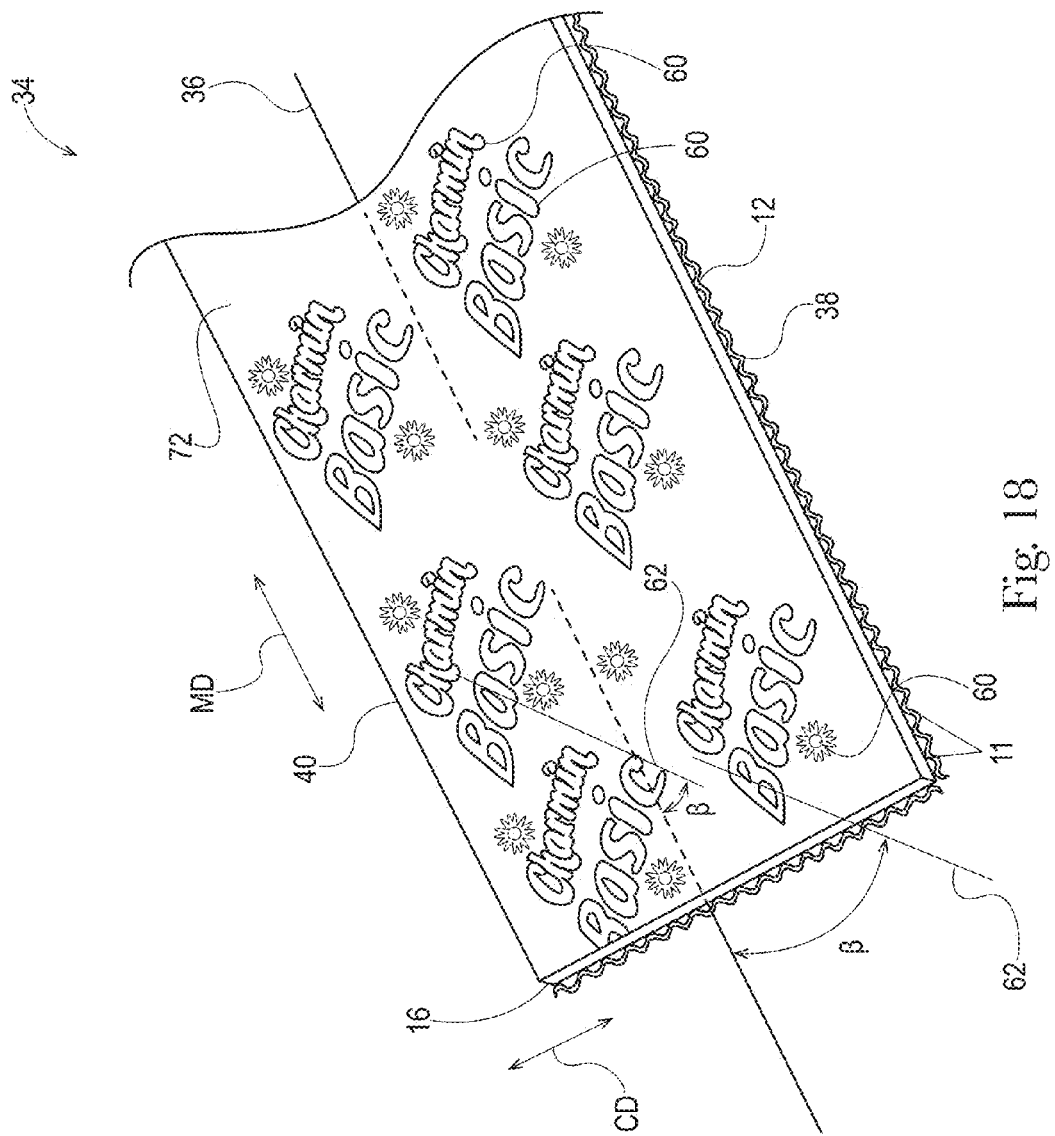
FIG. 18 is a perspective view of a strip of material for winding into a fibrous core of the present disclosure having indicia thereon.

As discussed above, a strip 34 can be wound to form the fibrous core 10. In one example embodiment, the strip 34 can comprise one or more indicia 60 printed or embossed on the at least one of the first strip face 70 and the second strip face 72, which is opposite the first strip face 70, as shown in FIGS. 17 and 18. In one embodiment, the first strip face 70 can comprise a fluted layer 12 and the second strip face 72 can comprise a liner 16. The first strip face 70 and the second strip face 72 can include one or more indicia 60 printed or embossed in an orientation that makes an angle with respect to the strip axis 36. More specifically, the one or more indicia 60 can comprise letters, words, and/or symbols positioned relative to some angle β from the strip axis 36. The angle β can be measured from the strip axis 36 to a bisecting line 62 that bisects the letter, word, or symbol, substantially perpendicular to a reading orientation, as shown in FIGS. 17 and 18. The angle β can be from about 0 degrees to about 90 degrees and/or about 30 degrees to about 60 degrees and/or about 45 degrees from the strip axis 36 to a bisecting line 62. In an embodiment, angle β can be substantially equal to wind angle ε, as discussed above.

In one embodiment, the one or more indicia 60 printed or embossed on the first strip face 70 can be the same indicia as, and at the same orientation as, the one or more indicia 60 printed on the second strip face 72. That is, in an embodiment both faces, 70 and 72, of strip 34 can be printed in exactly the same print pattern, thus simplifying the print operation significantly. Further, surprisingly it has been found that by printing both faces, 70 and 72, of strip 34, at the same angle, for example an angle β of about 45 degrees, and winding strip 34 on mandrel 42 at an angle ε of about 45 degrees, one achieves a fibrous core 10 in which the indicia 60 on the inner surface 22 can be at reading orientation when the fibrous core 10 is at a shipping orientation and the indicia 60 on the outer surface 14 can be at a reading orientation when the fibrous core 10 is in a dispensing orientation, as shown in FIGS. 15 and 16. Alternatively, the one or more indicia 60 printed or embossed on the first strip face 70 can be different indicia but in the same orientation as the one or more indicia 60 printed or embossed on the second strip face 72. For example, the one or more indicia 60 on the inner surface 14 can comprise a logo and the one or more indicia 60 on the outer surface 14 can comprise an advertisement or coupon, or vice versa. Still in another embodiment, the one or more indicia 60 printed or embossed on the first strip face 70 can be different indicia and in a different orientation than the one or more indicia 60 on the second strip face 72.

The orientation or angle β of the one or more indicia 60 on the first strip face 70 and/or the second strip face 72, and the wind angle ε of winding the fibrous core 10 on the mandrel 42, determines the orientation of the one or more indicia 60 on the wound fibrous core 10. For example, as discussed above, the one or more indicia 60 present on the first strip face 70 can be at an angle β substantially equal to about 45 degrees from the strip axis 36 to a bisecting line 62 such that when the strip 34 is helically wound at a 45 degree angle to form a fibrous core 10 comprising an outer surface 14 including one or more indicia 60, the one or more indicia 60 on the outer surface 14 can be at a reading orientation when the fibrous core 10 is in a dispensing position, as shown in FIG. 16. Similarly, in another embodiment, the one or more indicia 60 present on the second strip face 72 can be at an angle β substantially equal to about 45 degrees from the strip axis 36 to a bisecting line 62 such that when the strip 34 is hectically wound to form a fibrous core 10 comprising an inner surface 22 including one or more indicia 60, the one or more indicia 60 on the inner surface 22 can be at a reading orientation when the fibrous core 10 is in a shipping position. In general, angle β and the wind angle ε, as shown in FIGS. 7 and 10, can be varied as desired to produce the desired print orientation on the finished fibrous core 10. In an embodiment, both a printed trademark or brand name indicia 60 can be printed on the outer surface 14 of the fibrous core 10 such that the indicia 60 is in a reading orientation when the fibrous core is in a dispensing position, and a trademark or brand name indicia 60 can be printed on the inner surface 22 of the fibrous core 10 such that the indicia is in a reading orientation when it is in a shipping position. In an embodiment where a trademark or brand name is in a curved orientation, a reading orientation can be such that at a midpoint of the curved word or symbol, a line 62 bisects the word or symbol at a substantially right angle to the traditional reading orientation.

Figure 19A:
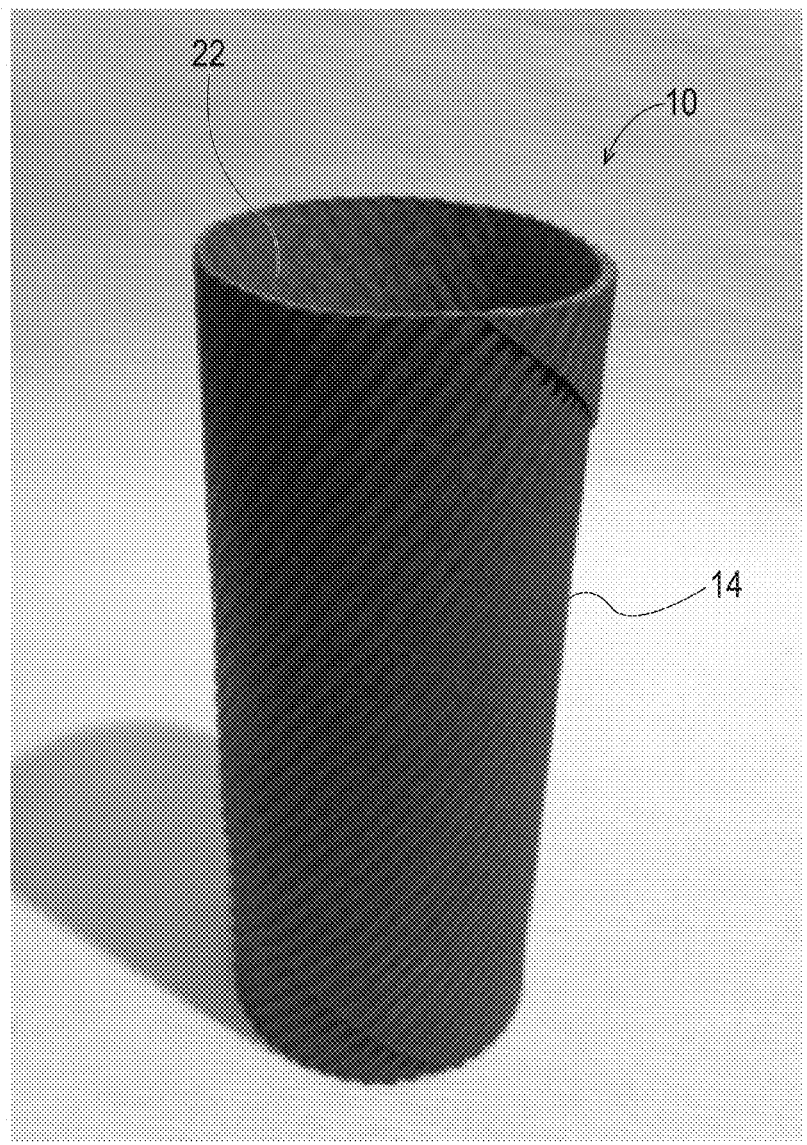
FIGS. 19 A-C are photographs of various fibrous cores of the present disclosure.
Figure 19B:
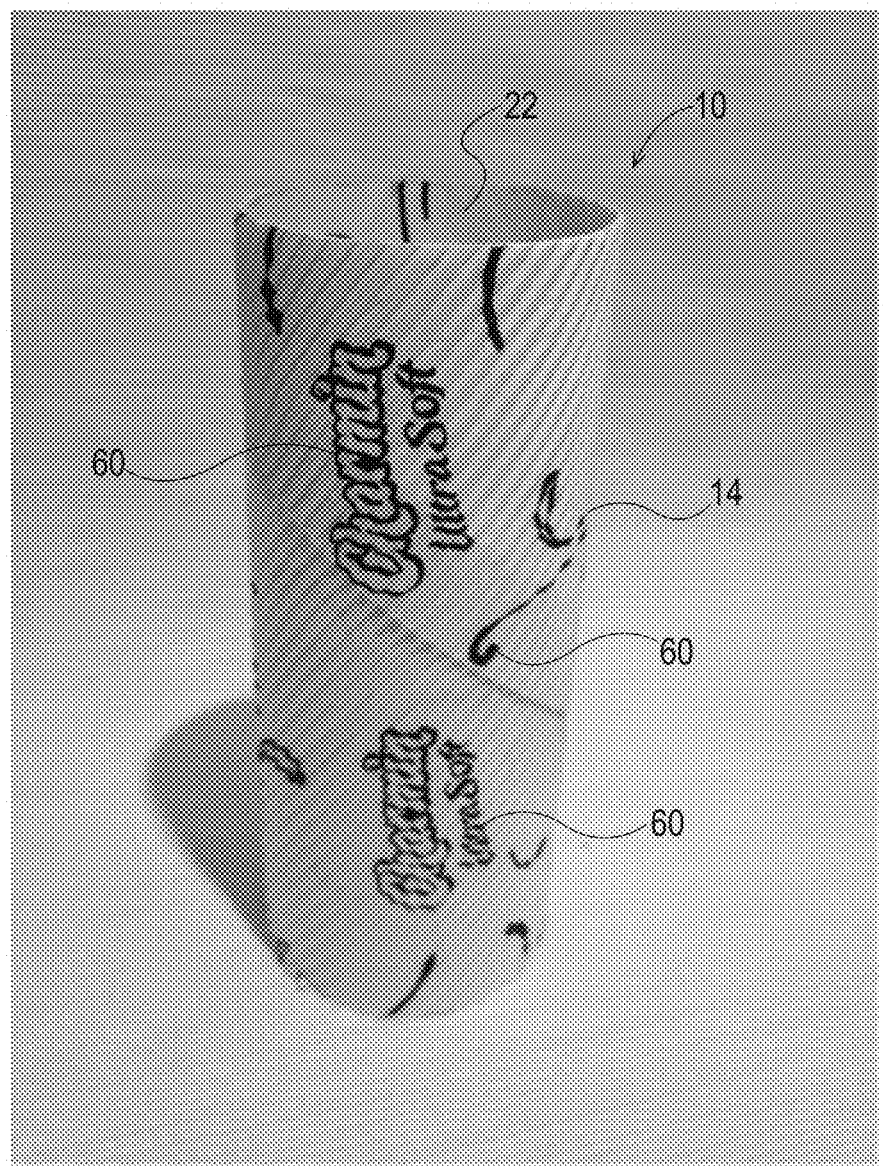
Figure 19C:
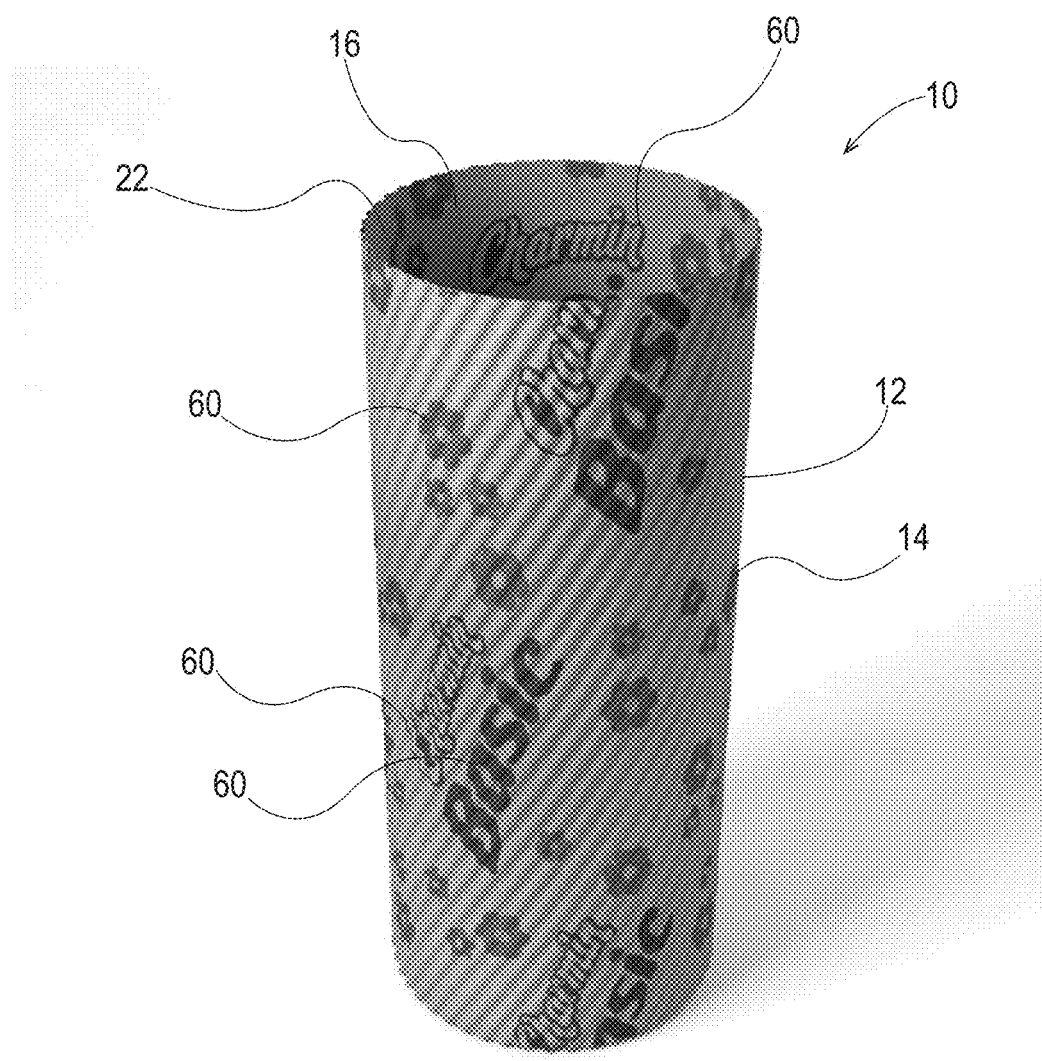

In one embodiment, the fibrous core 10 can be made from colored paper, or printed paper, or paper substantially covered with colored dye as shown in FIGS. 19 A-C such that at least part of the outer surface 14 and/or the inner surface 22 can be a color or hue different from recycled paper or conventional brown paperboard. That is, the outer surface 14 or inner surface 22 can be printed on, dyed, or manufactured to be a color other than conventional brown paperboard. For example, the fibrous core 10 can comprise an outer surface 14 that is printed or substantially covered with purple dye and an inner surface 22 that is either not printed or substantially free of colored dye. The outer surface 14 can be substantially covered so that at least about 20% to 100% of the outer surface 14 is covered with colored dye. Alternatively, the fibrous core 10 can comprise an outer surface 14 and an inner surface 22 that can be substantially covered with one or more colored dyes. In another embodiment, the fibrous core 10 can be substantially covered with more than one color of colored dye or one or more hues of colored dye. In still another embodiment, the fibrous core 10 can be manufactured such that the fluted layer 12 and/or the liner 16 is made from virgin/bleached paperboard.

Figure 20:
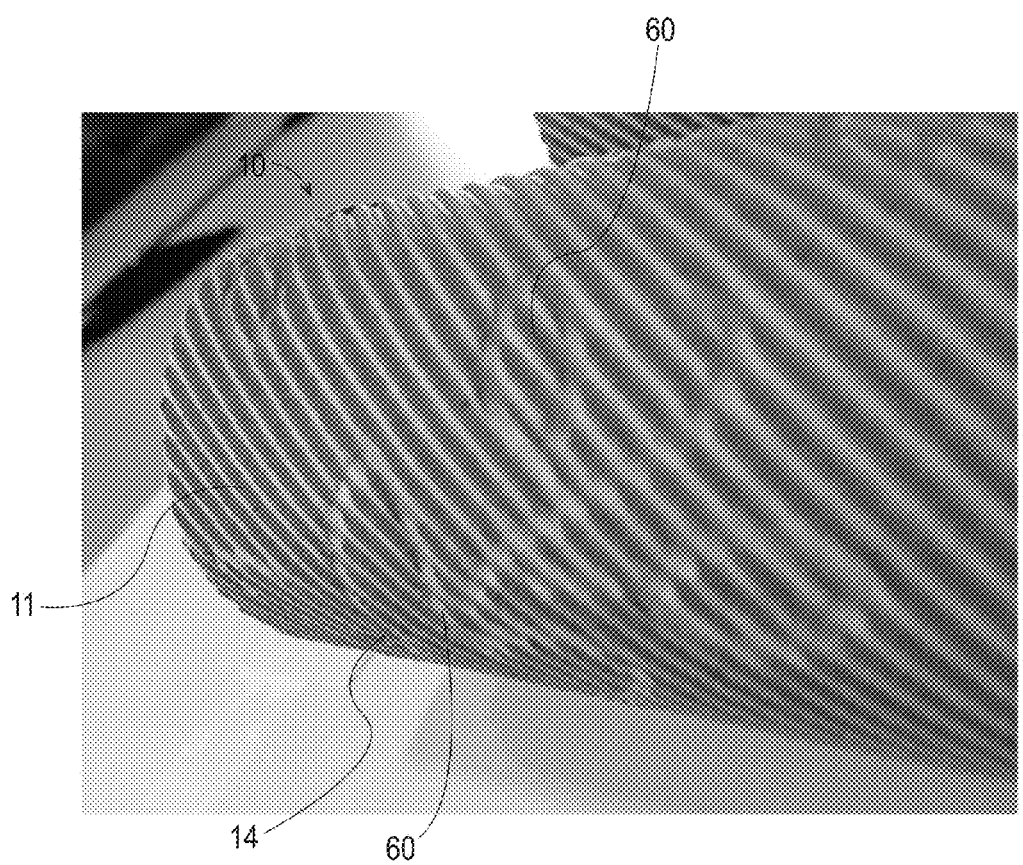
FIG. 20 is photograph of a portion of a fibrous core of the present disclosure having embossed indicia.
Figure 21:
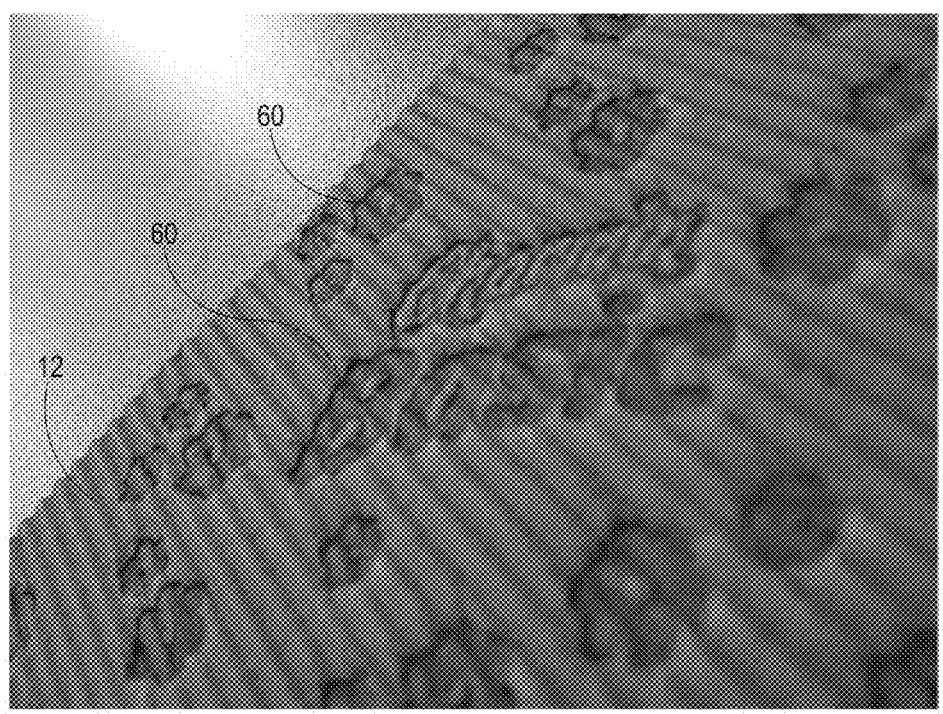
FIG. 21 is photograph of a portion of a fibrous core of the present disclosure having embossed and printed indicia.

As shown in FIG. 20, indicia 60 can be embossed into the fluted layer 12 of first strip face 70. Embossed indicia 60 can be embossed prior to winding on the winding mandrel 42 in the core making operation, as described below. Embossing can provide for a non-printed, but highly visible, image of a logo, trademark, or brand name, similar to printing. Embossing can be achieved by pressing an emboss element, such as a steel emboss plate having the desired emboss design machined into it, onto strip 34 prior to winding onto mandrel 42. Alternatively, embossing ban be achieved by pressing an emboss element onto the fluted layer 12 prior to adhering to the liner 16 to form the strip 34. All the disclosure above with respect to printed indicia 60 can be applied to achieve embossed indicia 60. In an embodiment, a fibrous core 10 can have embossed indicia 60, printed indicia 60, or both, as shown in FIG. 21.

Packaging

Figure 22:
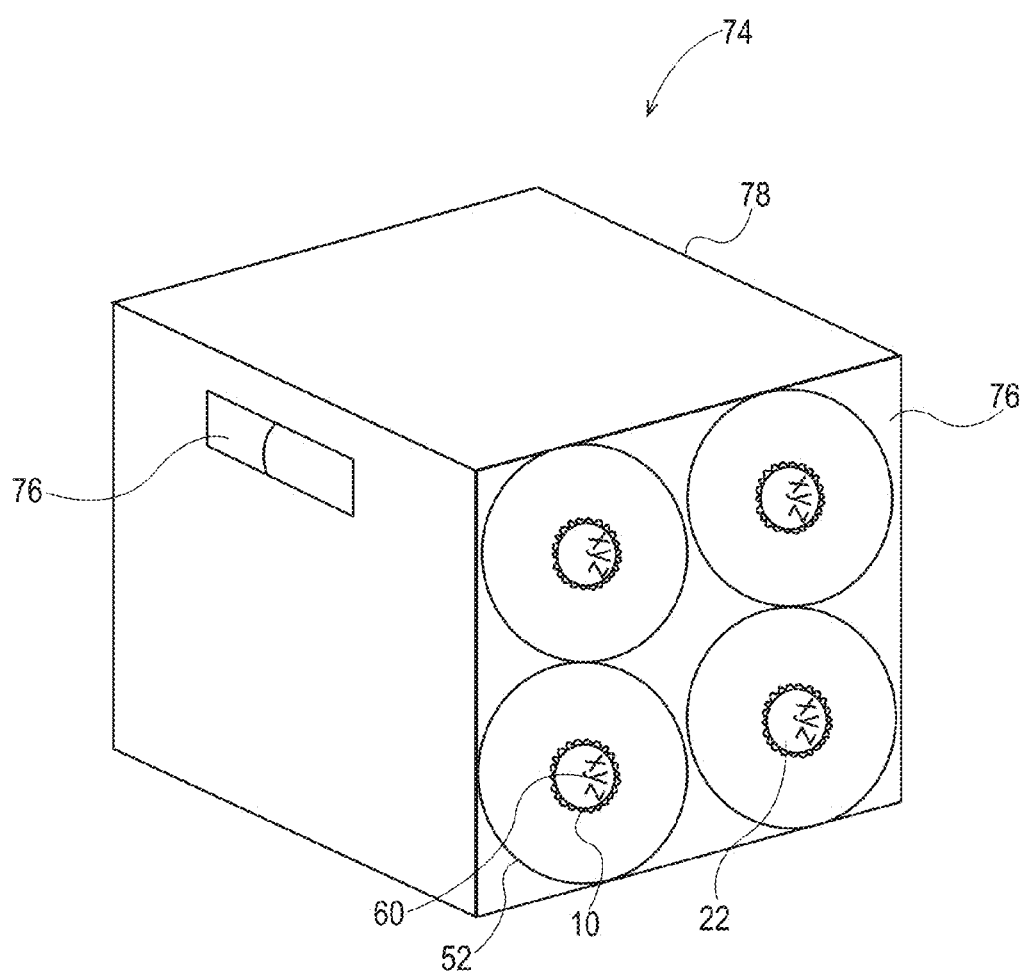
FIG. 22 is a perspective view of a package of one or more fibrous cores of the present disclosure.
Figure 23:
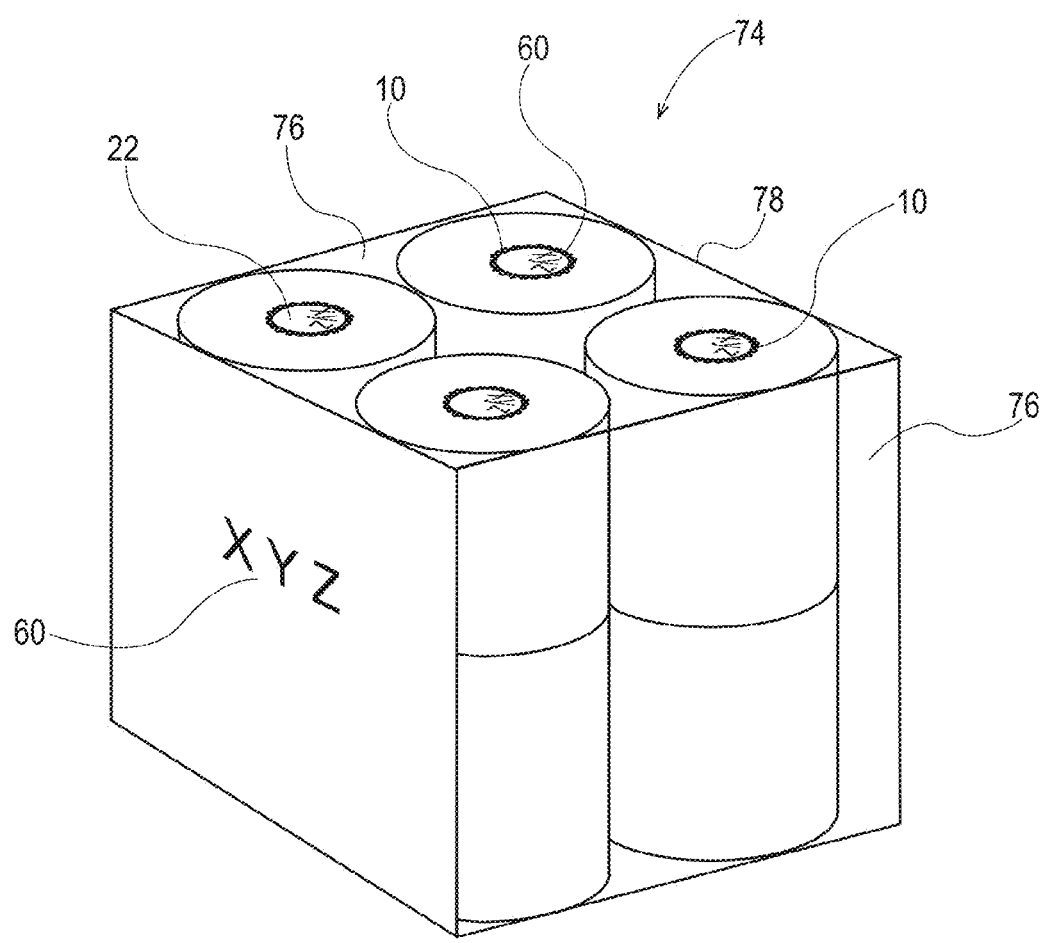
FIG. 23 is a perspective view of a package of one or more fibrous cores of the present disclosure.

A packaged article 74 can comprise a rolled sheet product 52 wound about a fibrous core 10 substantially surrounded by a packaging material 78, as shown in FIGS. 22 and 23. The packaged article 74 can be more easily transported, supplied, housed, and displayed. The packaging material 78 can be made of any suitable material, such as plastic or cardboard. The packaging material 78 can comprise at least one viewable face 76, wherein the viewable face 76 allows a consumer to see the fibrous core 10 comprising rolled sheet product 52 through the packaging material 78 or lack of packaging material. For example, the viewable face 76 can be a transparent portion, such as clear polymer packaging, or an open portion, such as a lack of paperboard packaging. More specifically, the inner surface 22 of the fibrous core 10 can comprise one or more indicia 60, and the viewable face 76 of the packaging material 78 can allow a consumer to see the one or more indicia 52 on the fibrous core 10 substantially surrounded by the packaged article 74. In one embodiment, the one or more indicia 60 can be seen by a consumer at any orientation while the packaged article 74 is on a surface such as a pallet or store shelf. In another embodiment, the one or more indicia 60 can be at a reading orientation while the packaged article 74 is placed on a substantially horizontal surface such as a store shelf or a pallet. Thus, for example, the one or more indicia 60 can be seen at a reading orientation by a consumer viewing the rolled sheet product in the packaged article 74 on the horizontal surface.

Figure 24:
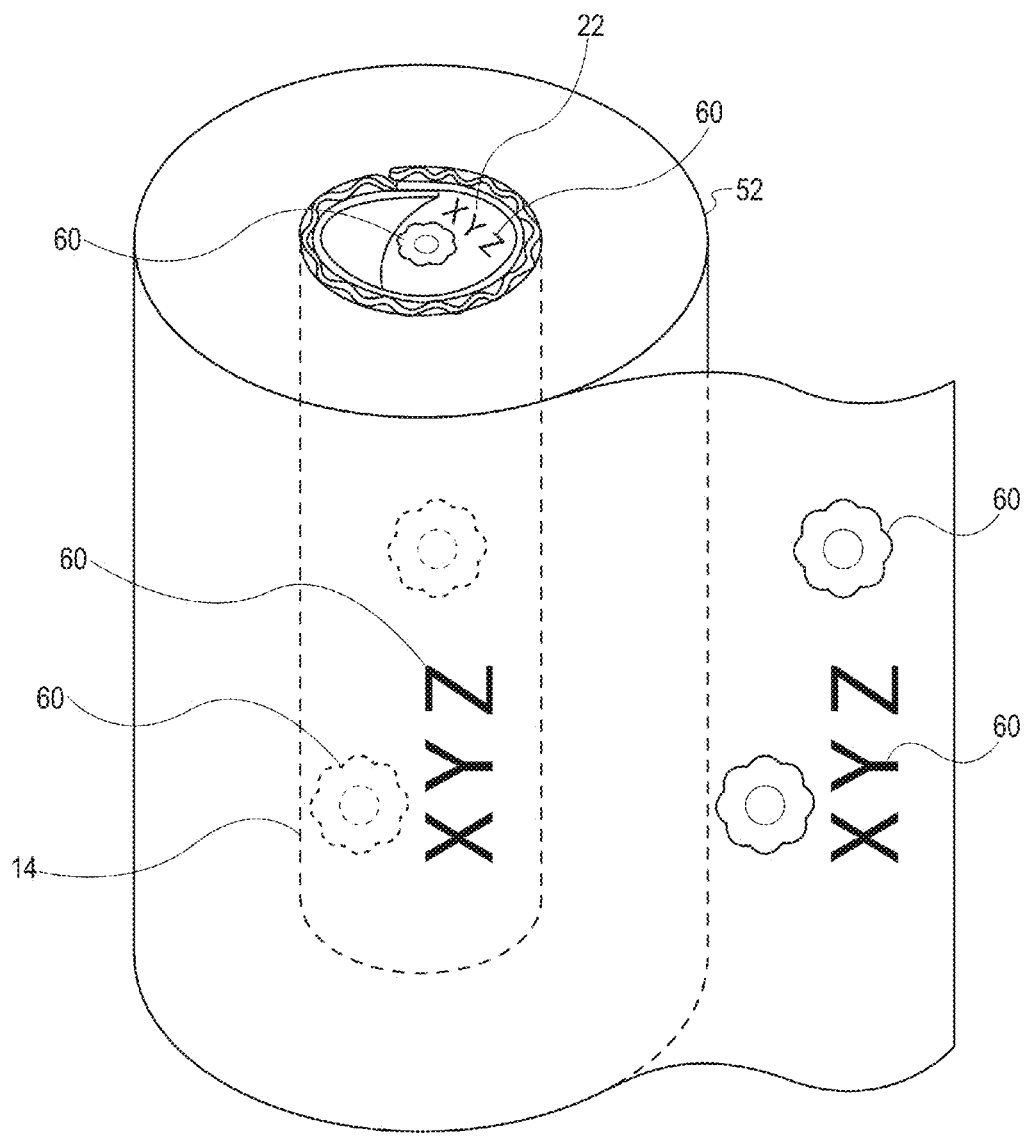
FIG. 24 is a perspective view of a fibrous core in combination with a rolled product in accordance with one non-limiting embodiment of the present disclosure.

In another example embodiment, the package article 74 can comprise one or more indicia 60 disposed on the packaging material 78, as shown in FIG. 23. The indicia 60 disposed on the fibrous core 10 can be different than, similar to, or the same as the one or more indicia 60 disposed on the packaging material 78. In still another embodiment, the indicia 60 disposed on the fibrous core 10 can be different than, similar to, or the same as the one or more indicia disposed on the packaging material 78, as shown in FIG. 23, and/or the one or more indicia disposed on the rolled sheet product 52, as shown in FIG. 24. For example, the indicia 60 disposed on the fibrous core can be similar to the one or more indicia disposed on the packaging material in that the indicia can of similar size and/or of similar color and/or of similar configuration. Similar indicia can be that indicia that a consumer would perceive as having related characteristics. The same indicia can be that indicia that shares all characteristics but can be proportionally different. By contrast, different indicia can be that indicia that is not of a similar configuration and does not have related characteristics.

In yet another embodiment, as shown in FIG. 24, a fibrous core 10 can comprise one or more indicia 60 disposed on at least one of the inner surface 22 and the outer surface 14 and a rolled sheet product 52 wound about the outer surface 14. Further, the rolled sheet product 52 can comprise one or more indicia 60. The one or more indicia 60 disposed on the rolled sheet product 52 can be printed and/or embossed, for example. The one or more indicia 60 disposed on the rolled sheet product 52 can be similar to or the same as the one or more indicia disposed on at least one of the inner surface 22 and the outer surface 14 of the fibrous core 10. For example, the last sheet of the rolled sheet product 52, which can be removably attached to the fibrous core 10, can comprise one or more indicia 60. The one or more indicia 60 on the last sheet of the rolled sheet product 52 can be similar to or the same at the one or more indicia 60 disposed on the outer surface 14 of the fibrous core. Alternatively or in addition to the above, the first sheet of rolled sheet product 52 can comprise one or more indicia 60. The one or more indicia 60 on the first sheet of rolled sheet product 52 can be similar to or the same as the one or more indicia 60 disposed on the inner surface 22 of the fibrous core 10.

In still another embodiment, not shown, the one or more indicia 60 disposed on the fibrous core 10 and the one or more indicia 60 disposed on the rolled sheet product 52 and the one or more indicia 60 disposed on the packaging material 78 can be similar or the same. Similarly, at least one of the one or more indicia 60 disposed on the fibrous core and the one or more indicia 60 disposed on the rolled sheet product can be similar to or the same as the one or more indicia 60 disposed on the packaging material 78. Coordinating indicia on one or more of the fibrous core 10, rolled sheet product 52, and packaging material 78 gives awareness of a brand or logo to consumers, which satisfies manufacturers desire to build brand recognition and loyalty.

It is known in the commercial sanitary tissue business that fibrous cores serve not only a function for the consumer, but they also serve a function for the manufacturer. That is, in addition to providing for product qualities that the consumer appreciates, many of which are enhanced by the present invention, the fibrous cores aid in manufacturing, storing, and shipping. Specifically, when shipped in a vertical position, the fibrous core acts as a column to help support and stabilize the packaged articles, particularly when stacked on pallets for shipping, as is known in the art. Manufacturers can often stack multiple packaged articles onto one pallet, with the lower-most layer of packaged articles bearing the weight of all the packages stacked above.

One advantage of the present invention is the ability to optimize the basis weight (and therefore, the cost) of the fibrous core utilized for various types of rolled sanitary tissue products. It has been discovered that tightly wound rolled sanitary tissue products, such as "jumbo" rolls of bath tissue or paper towels, require less columnar support from the fibrous core when packaged as packaged articles and stacked on pallets. That is, the tightly wound sanitary tissue product provides much of its own support due to the bulk density of the rolled product. However, the converse is also true: loosely wound sanitary tissue products rely more on the fibrous core to provide columnar support to avoid crushing when stacked on pallets as packaged articles.

The present invention solves the problem of how to optimize the axial strength for a given sanitary tissue product and its roll tightness, which can be thought of as a bulk density. Bulk density can be defined as the weight of the roll divided by its volume. For relatively high bulk density rolls, the fibrous core can have relatively low axial strength relative to a fibrous core utilized for a relatively low bulk density roll.

Figure 25:
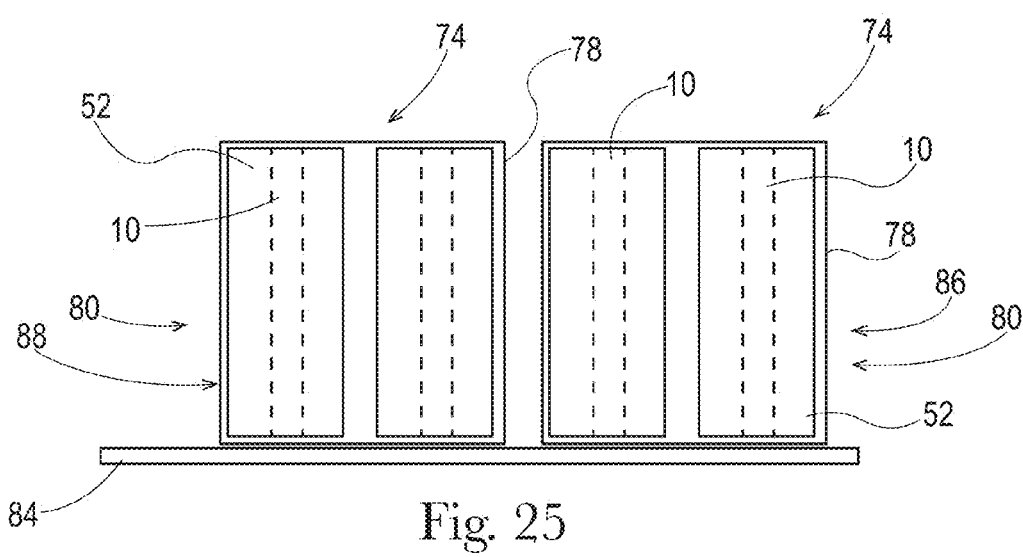
FIG. 25 is a side view of a display of packaged articles in accordance with one non-limiting embodiment of the present disclosure.

The ability to optimize the axial strength for varying roll bulk density, i.e, how tightly a sanitary tissue product is wound, permits a manufacturer or marketer to optimize the cost of products offered in a retail environment. As shown in FIG. 25, for example, a shelf 84 in a retail environment can have displayed thereon two packaged articles 74, both of which are the same type of product, such as packages of paper towels 80. In the embodiment shown, each package of paper towels 80 has two rolled sheet products 52, which in the embodiment shown can be rolled sanitary tissue products, specifically paper towel products. Each rolled sanitary tissue product has a fibrous core 10. The fibrous core 10 can comprise one or more indicia.

The two packages of paper towels 80 shown in FIG. 25 can differ in their bulk density, i.e., how tightly the sanitary tissue products for each are wound onto their respective fibrous cores 10. For example, the package of paper towels designated as 86 can be a relatively loosely wound roll of paper towels, and the package of paper towels designated as 88 can be a relatively tightly wound roll of paper towels. The package of paper towels designated as 86 can have a fibrous core 10 having a relatively higher axial strength relative to the fibrous core of the package of paper towels designated as 88. Likewise, the package of paper towels designated as 88 can have a fibrous core 10 having a relatively lower axial strength relative to the fibrous core 10 of the package of paper towels designated as 86. By tailoring the axial strength of the fibrous core 10 to the relative axial strength provided by the wound paper, the two packaged articles 74 can have the same or similar, or, at minimum, sufficient axial compression resistance to be stacked and shipped on pallets without damage.

Still referring to FIG. 25, the package designated as 88 can have a fibrous core 10 comprising a first indicia that is different from a second indicia disposed on the fibrous core 10 contained in the package designated as 86. For example, the package designated as 86 can have a fibrous core 10 comprising indicia, wherein the indicia can comprise one or more letters such as BOUNTY BASIC®. By contrast, the package designated as 88 can have a fibrous core 10 comprising indicia, wherein the indicia can comprise one or more letters such as BOUNTY®.

Figure 26:
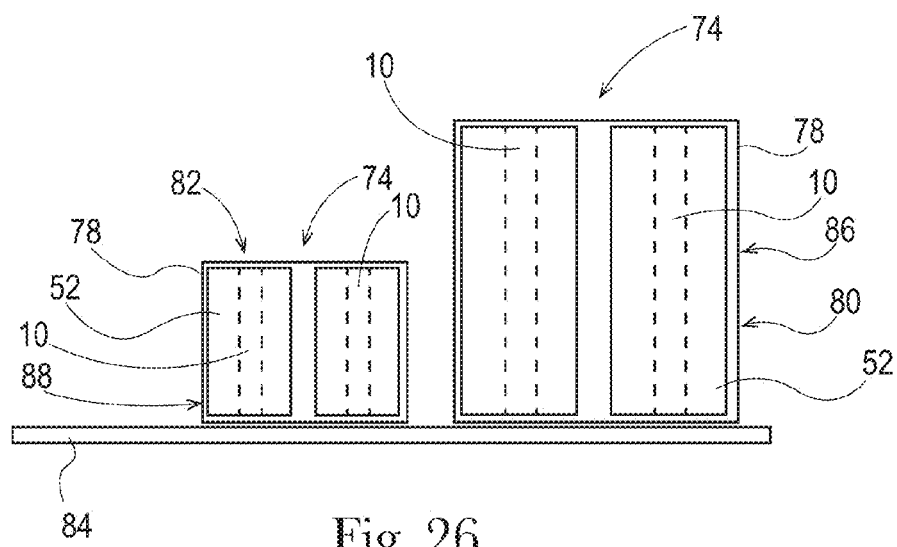
FIG. 26 is a side view of a display of packaged articles in accordance with one non-limiting embodiment of the present disclosure.

As shown in FIG. 26, the packaged articles can be different types. As shown in FIG. 26, for example, a shelf 84 in a retail environment can have displayed thereon two packaged articles 74, which are different types of product, such as a package of paper towels 80 and a package of bath tissue 82. In the embodiment shown, each package of paper towels 80 and each package of bath tissue 82 has two rolled sheet products 52, which in the embodiment shown can be rolled sanitary tissue products, specifically paper towel products and bath tissue products, respectively. Each rolled sanitary tissue product has a fibrous core 10.

As discussed above, the present invention allows a manufacturer or marketer to optimize fibrous core strength relative to the axial compression resistance provided by the rolled sanitary tissue products. The two packages of paper towels 80 shown in FIG. 26 can differ in their bulk density, i.e., how tightly the sanitary tissue products for each are wound onto their respective fibrous cores. For example, a package of paper towels designated as 86 can be a relatively loosely wound roll of paper towels, and the package of sanitary bath tissue 82 designated as 88 can be a relatively tightly wound roll of bath tissue. The package of paper towels designated as 86 can have a fibrous core 10 having a relatively higher axial strength relative to the fibrous core of the package of bath tissue designated as 88. Likewise, the package of bath tissue designated as 88 can have a fibrous core 10 having a relatively lower axial strength relative to the fibrous core of the package of paper towels designated as 86. By tailoring the axial strength of the fibrous core to the relative axial strength provided by the wound paper, the two packaged articles 74 can have the same or similar, or, at minimum, sufficient axial compression resistance to be stacked and shipped on pallets without damage.

Referring to FIG. 26, the package designated as 88 can have a fibrous core 10 comprising a first indicia that is different from a second indicia disposed on the fibrous core 10 contained in the package designated as 86. For example, the package designated as 86 can have a fibrous core 10 comprising indicia, wherein the indicia can comprise one or more letters such as BOUNTY®. By contrast, the package designated as 88 can have a fibrous core 10 comprising indicia, wherein the indicia can comprise one or more letters such as CHARMIN®.

Therefore, in an embodiment, the present invention can be described as an array of sanitary tissue products, which can be an array on a shelf 84 in a retail environment. The array can have a first packaged article, the first packaged article having a first rolled sanitary tissue product which is wound onto a first fibrous core 10. The array can also have a second packaged article, the second packaged article having a second rolled sanitary tissue product which is wound onto a second fibrous core. The second rolled sanitary tissue product can be wound loosely relative to the first rolled sanitary tissue product, and the second fibrous core can have an axial strength greater than that of the first fibrous core. At least one of the first fibrous core and the second fibrous core can comprise indicia. The first fibrous core and/or the second fibrous core can be made from a single face corrugate material.

Method

Figure 27:
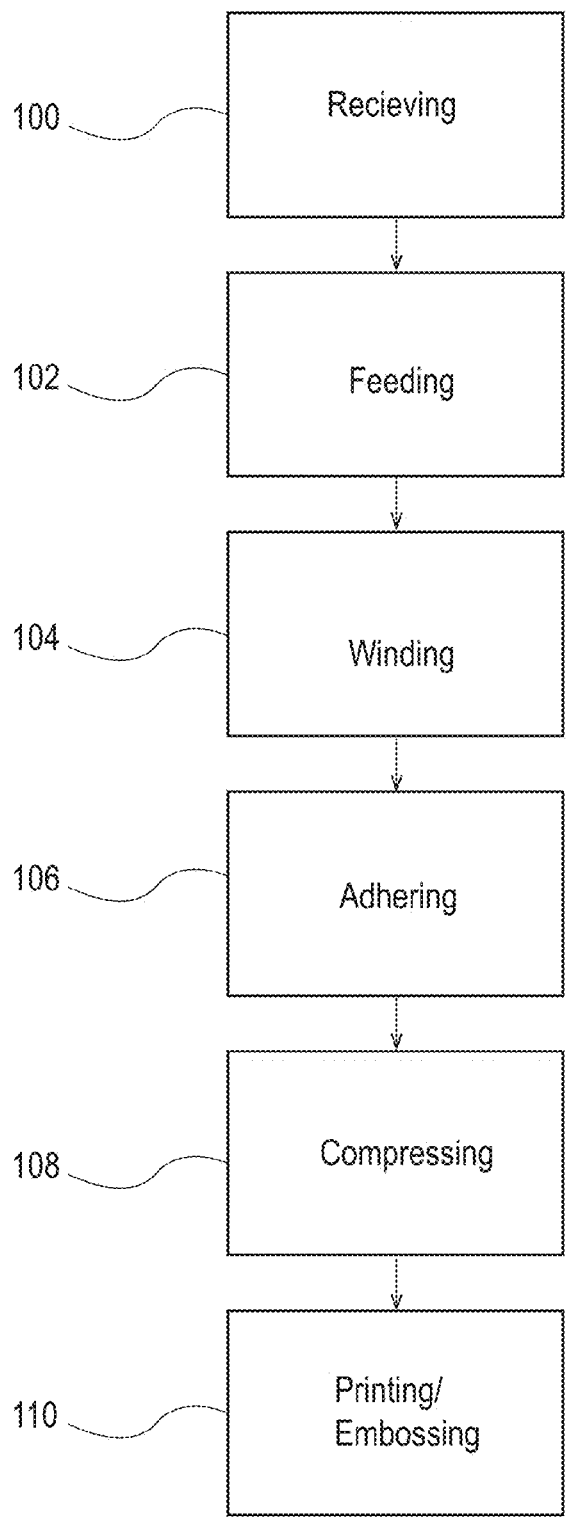
FIG. 27 is a schematic diagram of a process flow for making fibrous cores of the present disclosure.

As described with reference to the flow chart of FIG. 27, the fibrous core 10 of the present disclosure can be wound on a shaft with a belt drive means as described, for example, in U.S. Pat. No. 7,007,887, entitled Tubular Core with Polymer Plies. At least one of a fluted layer 12, and a liner 16, which can be attached to form a strip 34 that can be received 100 and fed 102 onto a mandrel for winding into a fibrous core 10. In an embodiment, the strip 34 of material, which can be, for example, a strip 34 of single-face corrugate material 18, can be fed 102 at wind angle ϵ onto a mandrel 42 having a central longitudinal axis 44 extending in a longitudinal direction. The strip 34 of material can be wound 104 as it is fed onto the mandrel. The winding of the strip 34 can be such that a leading edge 21 of the strip 34 overlaps a trailing edge 23 of the strip 34 to form an overlap portion 46 having an overlap width 45. The leading edge can be adhered 106 to the trailing edge of the strip 34 to form the fibrous core 10. Alternatively, the winding of the strip 34 can be such that a first edge overlaps a second edge of the strip to form an overlap portion 46 having an overlap width. The first edge can be adhered to the second edge to form the fibrous core 10. In yet another embodiment, the winding of the strip 34 can be such that a first edge abuts a second edge of the strip to form a seam 24. In one embodiment, the fibrous core 10 comprises a liner 16 disposed radially inward to from an inner surface 22 and a fluted layer 12 opposite the liner 16 to form an outer surface 14.

In one example embodiment, compressed portion 57 of the strip 34 along at least one of the first edge 38 or leading edge 21 and the second edge 40 or trailing edge 23 of the strip 34 can be compressed 108 to form a substantially reduced thickness in the compressed area (as shown in FIGS. 9, 9A, and 9B above). By compressing a portion 57 of the width of the strip 34 along one or both of the first edge 38 or second edge 40 to reduce the thickness, the overall thickness of the fibrous core 10 in the overlap portion 46 can be reduced to less than twice the thickness of strip 34, thereby rendering the outer surface 14 smoother at seam 24. In one embodiment, the compression can be achieved as discussed above with reference to FIGS. 9, 9A, and 10. That is, while the strip 34 is being fed onto the mandrel, one or more compression rollers can apply a normal force F to strip 34 in compressed portion 57 to permanently compress and reduce the thickness thereof. Likewise, as shown in FIG. 10, the normal force F can be applied at the time of winding by use of a pressure foot (or roller) 48 applying a normal force F against the strip 34 in the area of overlap 46. As discussed above, presser foot 48 can be a roller, such as a hardened rubber roller, which rolls as the strip is turned during winding. Presser foot (or roller) 48 can be held against strip 34 in any known manner, such as by brackets, spring loaded arms, or hydraulic cylinders (not shown).

The fibrous core can be printed 110 with indicia as discussed above.

The fibrous core 10 can be cut by known means to a length suitable for subsequent operations, such as winding of a log roll of absorbent paper product prior to cutting into finished rolls of, for example, bath tissue or paper towels.

In still another embodiment, as discussed above, printing step 110 can be eliminated if the strip 34, is printed or embossed prior to or subsequently being wound on the mandrel.

Test Method

Axial Strength

To determine the axial strength of fibrous cores, the CCTI Standard Testing Procedure, CT-107, May 1981, Review and Reapproved July 2001, Axial (End-to-End) Compression of Composite Cans, Tubes, and Cores was used with modifications as discussed below. The relevant portions of the CCTI Standard Testing Procedure of Axial Compression are included herein with the appropriate modifications.

The objective of CT-107 test procedure is to measure the maximum force in axial direction that a composite can, tube, or core can withstand by compressing it between two parallel platens moving at a constant speed towards each other.

A compression testing machine was used, having flat upper and lower platens which are held rigidly parallel during testing, permitting movement in a vertical direction only. The speed of each moving platen was set to 100 mm per minute or about 4 inches per minute. The compression machine was calibrated by Methods of Verification of Testing Machines (ASTM Designation: E4).

The cores were tested in lengths as supplied to consumers with rolled sheet product (e.g., the core length as used in BOUNTY® brand paper towels and CHARMIN® brand bath tissue (100 mm)). The selected specimens had minimal end damage in order to keep the end surfaces parallel to each other and perpendicular to the specimen axis.

The cores were pre-conditioned and conditioned in accordance with TAPPI Method #T-402 SP-08.

Each specimen was inserted into the compression-testing machine at the center between the two platens. After the initial contact between the platens and the core, the compression-testing machine measured the force at each increment of displacement of the core. The axial strength is the maximum force measured during the first 10% displacement of the core. The axial strength is recorded in Newtons.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to this disclosure or that claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A method for manufacturing a fibrous core, the method comprising:
    providing a strip comprising at least one liner, and at least one fluted layer, wherein the strip has a leading edge, a trailing edge opposite the leading edge, a first strip face, a second strip face opposite the first strip face, a thickness, and a strip axis substantially parallel to at least one of the leading edge and the trailing edge;
    compressing one or both of the leading edge or the trailing edge located in an overlap portion of the strip to about one-half the thickness;
    feeding the strip to a mandrel having a central longitudinal axis extending in a longitudinal direction, wherein the strip axis forms a wind angle with the central longitudinal axis;
    winding the strip onto the mandrel such that the leading edge of the strip overlaps the trailing edge of the strip to form a fibrous core comprising an inner surface, an outer surface, and a longitudinal core axis; and
    adhering the leading edge to the trailing edge of the strip to form the overlap portion having an overlap width.

2. The method of claim 1, wherein the outer surface comprises a fluted layer and wherein the inner surface comprises a liner.

3. The method of claim 1, wherein at least one of the first strip face and the second strip face comprise indicia positioned at an angle to the strip axis.

4. The method of claim 3, wherein the indicia is positioned at an angle of about 45 degrees from the strip axis, and wherein the wind angle is about 45 degrees.

5. The method of claim 3, wherein the indicia disposed on the outer surface is oriented substantially perpendicular to the longitudinal core axis.

6. The method of claim 3, wherein the indicia on the inner surface is oriented substantially parallel to the longitudinal core axis.

7. The method of claim 3, wherein the indicia is positioned at an angle from about 0 degrees to about 90 degrees from the strip axis.

8. The method of claim 3, wherein the angle of indicia on the strip axis and the wind angle form the fibrous core comprising indicia, wherein the indicia disposed on the outer surface of the fibrous core is positioned at a reading orientation when the fibrous core is in a dispensing position, and wherein the indicia disposed on the inner surface of the fibrous core is positioned at a reading orientation when the fibrous core is in a shipping position.

9. The method of claim 3, wherein the indicia comprises at least one of a letter, a word, and a symbol.

10. The method of claim 1, wherein the strip comprises a single face corrugate material.

11. The method of claim 1, further comprising applying adhesive to at least one of the first strip face and the second strip face.

12. The method of claim 1, wherein the overlap portion has a height less than two times the thickness of the strip.

13. The method of claim 1, further comprising applying adhesive to at least a portion of the outer surface of the fibrous core.

14. The method of claim 1, further comprising cutting the fibrous core to a length of between about 2.5 inches and about 14 inches.

15. The method of claim 1, further comprising embossing the strip to form indicia on at least one of the first strip face and the second strip face.

16. The method of claim 1, further comprising printing the strip to form indicia on at least one of the first strip face and the second strip face.

17. The method of claim 1, further comprising printing and embossing the strip to form indicia on at least one of the first strip face and the second strip face.

18. The method of claim 1, wherein an adhesive is present on about 20% to about 100% of the overlap width.

\* \* \* \* \*